(12) United States Patent
Wu et al.

(10) Patent No.: US 11,617,135 B1
(45) Date of Patent: Mar. 28, 2023

(54) DESTINATION-BASED SIDELINK WAKE-UP SIGNALING

(71) Applicant: QUALCOMM Incorporated, San Diego, CA (US)

(72) Inventors: Shuanshuan Wu, San Diego, CA (US); Kapil Gulati, Belle Mead, NJ (US); Anantharaman Balasubramanian, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/508,807

(22) Filed: Oct. 22, 2021

(51) Int. Cl.
*H04W 52/02* (2009.01)
*H04L 27/26* (2006.01)
*H04J 13/00* (2011.01)

(52) U.S. Cl.
CPC ..... *H04W 52/0232* (2013.01); *H04J 13/0029* (2013.01); *H04L 27/2614* (2013.01); *H04W 52/028* (2013.01)

(58) Field of Classification Search
CPC ......... H04W 72/0406; H04W 52/0229; H04W 72/121; H04W 52/0219; H04W 52/028; H04W 88/04; H04W 84/047; H04W 72/0446; H04W 4/40; H04W 76/14; H04W 56/001; H04W 8/005; H04W 76/28; H04W 52/02; Y02D 30/70
See application file for complete search history.

(56) References Cited

U.S. PATENT DOCUMENTS

| | | | |
|---|---|---|---|
| 2020/0314752 A1* | 10/2020 | Haque | H04W 76/28 |
| 2022/0124618 A1* | 4/2022 | Chae | H04W 72/0446 |
| 2022/0191794 A1* | 6/2022 | Pan | H04W 52/0232 |
| 2022/0225235 A1* | 7/2022 | Chae | H04W 52/0229 |
| 2022/0240183 A1* | 7/2022 | Hassan | H04W 72/0406 |

* cited by examiner

*Primary Examiner* — Jung Liu
(74) *Attorney, Agent, or Firm* — Holland & Hart LLP

(57) ABSTRACT

Methods, systems, and devices for wireless communications between a first device and a second device using a sidelink network are described. The second device may generate a wake-up signal (WUS) including a destination identifier indicating a destination node of the sidelink channel configured to receive the WUS. The first device may receive, from the second device, the WUS including the destination identifier. The first device may identify that the destination identifier indicated by the WUS is associated with the first device based on receiving the WUS. The first device may monitor resources of the sidelink channel based on identifying that the destination identifier is associated with the first device. The destination identifier may be indicated by an information element. Additionally or alternatively, the second device may generate the destination identifier using a gold sequence or a low peak-to-average-power ratio sequence.

26 Claims, 12 Drawing Sheets

DRX Cycle 210-a

DRX Cycle 210-b

PSCCH Message 215

DESTINATION-BASED SIDELINK WAKE-UP SIGNALING

FIELD OF TECHNOLOGY

The following relates to wireless communications, including destination-based sidelink wake-up signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications between UEs. Sidelink communications may be transmitted and received by UEs, which may be associated with NR systems. In some cases, UEs that implement sidelink communications may operate according various modes for power saving. For example, UEs may operate according to a discontinuous reception (DRX) mode, which may enable UEs to periodically switch into a low-power mode, which may be referred to as an off-duration. Some wireless communications systems may additionally support unicast, multicast, and broadcast sidelink communications between UEs. In some cases, one or more UEs may establish multiple communication links for unicast, multicast, and broadcast sidelink communications, and each communication link may be associated with a unique DRX mode.

SUMMARY

The described techniques relate to improved methods, systems, devices, and apparatuses that support destination-based sidelink wake-up signaling. Generally, the described techniques provide for a first user equipment (UE) receiving, from a second UE, a wake-up signal over a sidelink channel between the first UE and the second UE. The second UE may generate a sequence associated with the wake-up signal. The sequence may be generated based on a destination (ID). The wake-up signal may include the destination ID associated with the first UE. The destination ID may indicate an intended destination for the wake-up signal. The first UE may identify that the destination ID corresponds to the first UE. The first UE may monitor resources of the sidelink channel based on identifying that the destination ID is for the first UE. In some examples, the first UE may receive the wake-up signal an exit a discontinuous reception (DRX) mode. In some examples, the destination ID may be based on a gold sequence or a low peak-to-average-power ratio (PAPR) sequence associated with the first UE. The first UE may implicitly identify the destination ID encoded in the wake-up signal. In some examples, the destination ID may be included in an information element (IE) in the wake-up signal. The wake-up signal may be received by the first UE prior to a DRX on-duration or may at least partially overlap with a portion of the DRX on-duration. In some examples, the second UE may monitor resources of the sidelink channel based on transmitting the wake-up signal. For example, the second UE may monitor for transmissions from the first UE.

A method for wireless communication at a first user equipment (UE) is described. The method may include receiving, from a second UE, a wake-up signal over a sidelink channel between the first UE and the second UE, the wake-up signal including a destination identifier that indicates a destination node of the sidelink channel configured to receive the wake-up signal, identifying that the destination identifier indicated by the wake-up signal is associated with the first UE based on receiving the wake-up signal, and monitoring resources of the sidelink channel based on identifying that the destination identifier is associated with the first UE.

An apparatus for wireless communication at a first UE is described. The apparatus may include a processor, memory coupled with the processor, and instructions stored in the memory. The instructions may be executable by the processor to cause the apparatus to receive, from a second UE, a wake-up signal over a sidelink channel between the first UE and the second UE, the wake-up signal including a destination identifier that indicates a destination node of the sidelink channel configured to receive the wake-up signal, identify that the destination identifier indicated by the wake-up signal is associated with the first UE based on receiving the wake-up signal, and monitor resources of the sidelink channel based on identifying that the destination identifier is associated with the first UE.

Another apparatus for wireless communication at a first UE is described. The apparatus may include means for receiving, from a second UE, a wake-up signal over a sidelink channel between the first UE and the second UE, the wake-up signal including a destination identifier that indicates a destination node of the sidelink channel configured to receive the wake-up signal, means for identifying that the destination identifier indicated by the wake-up signal is associated with the first UE based on receiving the wake-up signal, and means for monitoring resources of the sidelink channel based on identifying that the destination identifier is associated with the first UE.

A non-transitory computer-readable medium storing code for wireless communication at a first UE is described. The code may include instructions executable by a processor to receive, from a second UE, a wake-up signal over a sidelink channel between the first UE and the second UE, the wake-up signal including a destination identifier that indicates a destination node of the sidelink channel configured to receive the wake-up signal, identify that the destination identifier indicated by the wake-up signal is associated with the first UE based on receiving the wake-up signal, and monitor resources of the sidelink channel based on identifying that the destination identifier is associated with the first UE.

In some examples of the method, apparatuses, and non-transitory computer-readable medium described herein, receiving the wake-up signal may include operations, features, means, or instructions for receiving, as part of the wake-up signal, an information element indicating the destination identifier of the wake-up signal.

In some examples of the method, apparatuses, and non-transitory computer-readable medium described herein, monitoring the resources of the sidelink channel may include operations, features, means, or instructions for monitoring a first transmission occasion of an on-duration associated with a first mode for the wake-up signal and monitoring a second transmission occasion of the on-duration for the wake-up signal, where the first transmission occasion and the second transmission occasion may be included in a same on-duration.

Some examples of the method, apparatuses, and non-transitory computer-readable medium described herein may further include operations, features, means, or instructions for activating one or more components during at least a portion of the on-duration, where monitoring the first transmission occasion may be based on activating the one or more components, deactivating the one or more components during the on-duration based on failing to detect the wake-up signal during the first transmission occasion, and activating the one or more components during the on-duration based on deactivating the one or more components during the on-duration, where monitoring the second transmission occasion may be based on activating the one or more components.

Some examples of the method, apparatuses, and non-transitory computer-readable medium described herein may further include operations, features, means, or instructions for identifying the destination identifier may be based on a gold sequence associated with the wake-up signal.

Some examples of the method, apparatuses, and non-transitory computer-readable medium described herein may further include operations, features, means, or instructions for identifying the destination identifier may be based on a low peak-to-average-power ratio (PAPR) sequence associated with the wake-up signal.

In some examples of the method, apparatuses, and non-transitory computer-readable medium described herein, monitoring the resources of the sidelink channel may include operations, features, means, or instructions for monitoring a transmission occasion for the wake-up signal, where the transmission occasion at least partially overlaps with an on-duration associated with a first mode.

In some examples of the method, apparatuses, and non-transitory computer-readable medium described herein, monitoring the resources of the sidelink channel may include operations, features, means, or instructions for monitoring a transmission occasion for the wake-up signal, where the transmission occasion at least partially overlaps with an off-duration associated with a first mode of operation of the first UE.

Some examples of the method, apparatuses, and non-transitory computer-readable medium described herein may further include operations, features, means, or instructions for entering, by the first UE, a first mode, where receiving the wake-up signal may be based on entering the first mode.

In some examples of the method, apparatuses, and non-transitory computer-readable medium described herein, entering the first mode may include operations, features, means, or instructions for deactivating one or more components.

In some examples of the method, apparatuses, and non-transitory computer-readable medium described herein, the first mode may be a low-power mode associated with refraining from monitoring at least some resources on the sidelink channel.

In some examples of the method, apparatuses, and non-transitory computer-readable medium described herein, the first mode may be a discontinuous reception (DRX) mode associated with the sidelink channel.

Some examples of the method, apparatuses, and non-transitory computer-readable medium described herein may further include operations, features, means, or instructions for entering, by the first UE, a second mode based on identifying that the destination identifier indicated by the wake-up signal may be associated with the first UE, where monitoring the resources may be based on entering the second mode.

In some examples of the method, apparatuses, and non-transitory computer-readable medium described herein, entering the second mode may include operations, features, means, or instructions for activating one or more components based on entering the second mode.

A method for wireless communication at a second UE is described. The method may include generating a wake-up signal including a destination identifier associated with a first UE, the destination identifier indicating a destination node of a sidelink channel configured to receive the wake-up signal, transmitting the wake-up signal to the first UE over the sidelink channel, and monitoring resources of the sidelink channel based on transmitting the wake-up signal that includes the destination identifier associated with the first UE over the sidelink channel.

An apparatus for wireless communication at a second UE is described. The apparatus may include a processor, memory coupled with the processor, and instructions stored in the memory. The instructions may be executable by the processor to cause the apparatus to generate a wake-up signal including a destination identifier associated with a first UE, the destination identifier indicating a destination node of a sidelink channel configured to receive the wake-up signal, transmit the wake-up signal to the first UE over the sidelink channel, and monitor resources of the sidelink channel based on transmitting the wake-up signal that includes the destination identifier associated with the first UE over the sidelink channel.

Another apparatus for wireless communication at a second UE is described. The apparatus may include means for generating a wake-up signal including a destination identifier associated with a first UE, the destination identifier indicating a destination node of a sidelink channel configured to receive the wake-up signal, means for transmitting the wake-up signal to the first UE over the sidelink channel, and means for monitoring resources of the sidelink channel based on transmitting the wake-up signal that includes the destination identifier associated with the first UE over the sidelink channel.

A non-transitory computer-readable medium storing code for wireless communication at a second UE is described. The code may include instructions executable by a processor to generate a wake-up signal including a destination identifier associated with a first UE, the destination identifier indicating a destination node of a sidelink channel configured to receive the wake-up signal, transmit the wake-up signal to the first UE over the sidelink channel, and monitor resources of the sidelink channel based on transmitting the wake-up signal that includes the destination identifier associated with the first UE over the sidelink channel.

Some examples of the method, apparatuses, and non-transitory computer-readable medium described herein may further include operations, features, means, or instructions for generating a seed of a gold sequence based on the destination identifier of the first UE, where the wake-up signal may be generated using the gold sequence.

In some examples of the method, apparatuses, and non-transitory computer-readable medium described herein, generating the wake-up signal may include operations, features, means, or instructions for generating the wake-up signal based on a low peak-to-average-power ratio (PAPR) sequence, where the low PAPR sequence may be based on the destination identifier.

In some examples of the method, apparatuses, and non-transitory computer-readable medium described herein, generating the wake-up signal may include operations, features, means, or instructions for generating the wake-up signal including an information element indicating the destination identifier.

In some examples of the method, apparatuses, and non-transitory computer-readable medium described herein, transmitting the wake-up signal may include operations, features, means, or instructions for transmitting the wake-up signal during a transmission occasion for the wake-up signal that at least partially overlaps with an on-duration associated with a first mode.

In some examples of the method, apparatuses, and non-transitory computer-readable medium described herein, the first mode may be a low-power mode associated with refraining from monitoring at least some resources on the sidelink channel.

In some examples of the method, apparatuses, and non-transitory computer-readable medium described herein, the first mode may be a DRX mode associated with the sidelink channel.

In some examples of the method, apparatuses, and non-transitory computer-readable medium described herein, transmitting the wake-up signal may include operations, features, means, or instructions for transmitting the wake-up signal during a transmission occasion for the wake-up signal that at least partially overlaps with an off-duration associated with a first mode of operation of the first UE.

In some examples of the method, apparatuses, and non-transitory computer-readable medium described herein, the wake-up signal may be transmitted during an on-duration associated with a first mode for the wake-up signal and the method, apparatuses, and non-transitory computer-readable medium may include further operations, features, means, or instructions for transmitting a second wake-up signal during the on-duration associated with the first mode.

Some examples of the method, apparatuses, and non-transitory computer-readable medium described herein may further include operations, features, means, or instructions for identifying resources for transmitting the wake-up signal, where transmitting the wake-up signal to the first UE over the sidelink channel may be based on identifying the resources.

DETAILED DESCRIPTION

Figure 1:
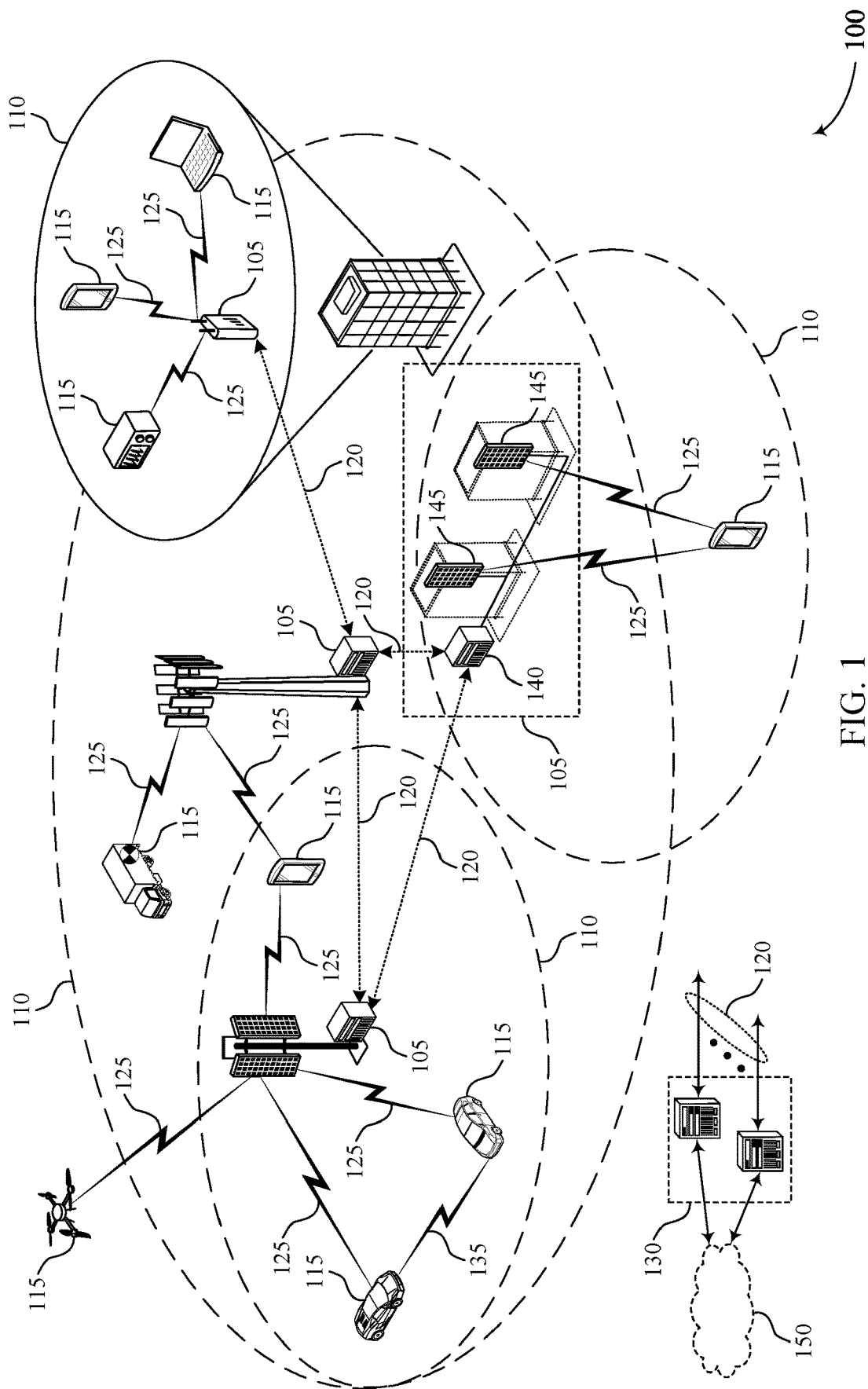
FIG. 1 illustrates an example of a wireless communications system that supports destination-based sidelink wake-up signaling in accordance with aspects of the present disclosure.

Some wireless communications systems may support sidelink communications between user equipments (UEs). Some wireless communications systems may additionally support unicast, multicast, and broadcast sidelink communications between UEs. Some UEs, such as vehicles in vehicle-to-everything (V2X) systems may have relatively large power supplies compared to other types of UEs, such as phones. Accordingly, some UEs (e.g., vehicles) may continuously monitor for and/or receive sidelink communications, which may consume power. In some cases (e.g., due to power limitations) a UE may not continuously monitor for sidelink communications and may operate according to a discontinuous reception (DRX) mode where the UE may monitor for sidelink communications periodically (e.g., a DRX on-duration).

In some sidelink networks, DRX cycles may be configured for each sidelink communication link between different UEs. For example, the UE may establish multiple unicast, groupcast, and/or broadcast sidelink communication links and the associated DRX cycles of each link may not be coordinated. In such examples, a DRX on-duration of a first sidelink communication link may overlap with a DRX off-duration of a second sidelink communication link. In such cases, the UE may operate according to the DRX on-duration (e.g., the UE may prioritize the DRX on-duration) and may not operate according to the DRX off-duration of the second sidelink communication link. Consequently, the UE may remain in an active state (e.g., the UE may operate according to the DRX on-duration) and may monitor for sidelink resources for an increased an amount of time.

Additional inefficiencies may be associated with the DRX mode for sidelink communications, which may increase power consumption associated with unicast, broadcast, and multicast sidelink communications. For example, a UE may decode multiple messages, such as physical sidelink control channel (PSCCH) messages, within a DRX on-duration that may not be intended for the UE or may not include useful information for the UE. In some cases, the UE may operate according to a DRX on-duration (e.g., the UE may monitor for sidelink transmissions) despite the absence of received packets. As a result, the UE may consume excess resources (e.g., communication resources and power resources).

Various aspects of the present disclosure relate to a UE receiving a sidelink wake-up signal (S-WUS) over a sidelink channel. The S-WUS may include a destination identifier (ID), which may be associated with the UE. Additionally or alternatively, the destination ID may include a unicast destination ID, a multicast destination ID, or a broadcast destination ID. A unicast destination ID may indicate a single node to receive the message. A multicast destination ID may indicate a plurality of nodes to receive the message. Any UE that is part of the multicast destination ID may treat the message as intended for itself. A broadcast destination ID may also indicate a plurality of nodes to receive the message and may be associated with an application or other service. In some cases, the UE may monitor resources on the sidelink channel based on identifying that the destination ID is associated with the UE. For example, the UE may receive the S-WUS and may exit the DRX mode based on receiving the S-WUS, which includes the destination ID associated with the UE. In some cases, the destination ID included in the S-WUS may be based on a gold sequence or a low peak-to-average-power ratio (PAPR) sequence associated with the UE, which may enable the UE to implicitly identify the destination ID encoded in the S-WUS. In some other cases, the destination ID may be included in an information element (IE) in the S-WUS. In some cases, the S-WUS may be received prior to a DRX on-duration. In some other cases, the S-WUS may at least partially overlap with a portion of the DRX on-duration.

Aspects of the disclosure are initially described in the context of wireless communications systems. Aspects of the disclosure are further illustrated by and described with reference to apparatus diagrams, system diagrams, and flowcharts that relate to destination-based sidelink wake-up signaling.

FIG. 1 illustrates an example of a wireless communications system 100 that supports destination-based sidelink wake-up signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Various aspects of the present disclosure relate to a UE receiving an S-WUS over a sidelink channel. The S-WUS may include a destination identifier ID, which may be associated with the UE. Accordingly, the UE may monitor resources on the sidelink channel based on identifying the destination ID in the S-WUS. For example, the UE may receive the S-WUS and may exit the DRX mode based on receiving the S-WUS. In some cases, the destination ID included in the S-WUS may be based on a gold sequence or a low PAPR sequence, which may enable the UE to implicitly identify the destination ID encoded in the S-WUS. In some other cases, the destination ID may be included in an IE in the S-WUS. In some cases, the S-WUS may be received prior to a DRX on-duration. In some other cases, the S-WUS may overlap with at least a portion of a DRX on-duration.

Figure 2:
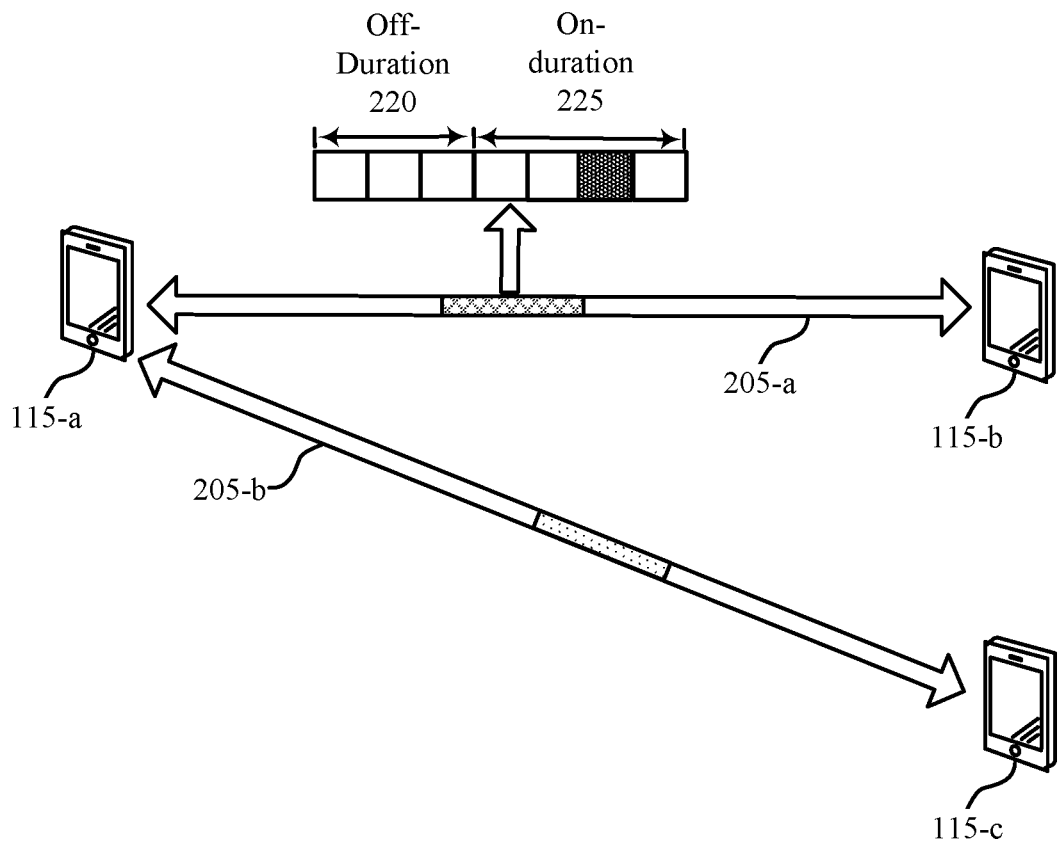
FIG. 2 illustrates an example of a wireless communications system that supports destination-based sidelink wake-up signaling in accordance with aspects of the present disclosure.
Figure 2:
Figure 2:
Figure 2:

FIG. 2 illustrates an example of a wireless communications system 200 that supports destination-based sidelink wake-up signaling in accordance with aspects of the present disclosure. In some examples, the wireless communications system 200 may implement aspects of the wireless communications system 100. For example, the wireless communications system 200 may include a UE 115-a, a UE 115-b, and a UE 115-c, which may be examples of UEs 115 described with reference to FIG. 1. In some cases, the UEs 115 may be examples of vehicles or other nodes within a V2X system. The wireless communications system 200 may support sidelink communications between devices, such as UEs 115 or base stations 105. In some examples, a base station or other node may participate in a sidelink communication network (such as Mode 1 for sidelink communications where the base station manages sidelink resources). In some examples, the UEs may manage the resources of the sideline communications network (e.g., Mode 2 for sidelink communications). The wireless communications system 200 may include a first sidelink communication link 205-a and a second sidelink communication link 205-b. In some cases, the UEs 115 may operate according to one or more DRX modes. In some cases, a DRX mode may include one or more DRX cycles 210. Each DRX cycle 210 may include a DRX on-duration 225 and a DRX off-duration 220. In some cases, a PSCCH message 215 may be transmitted during the DRX on-duration 225.

The wireless communications system 200 may support unicast, multicast, and broadcast sidelink communications between devices in the sidelink network (e.g., UEs 115). The nodes of the sidelink communications network described with reference to FIG. 2 are described as UEs, but other nodes such as base stations may be configured to perform the described techniques. In some examples, the UE 115-a may transmit information to the UE 115-b via the sidelink communication link 205-a, which may be an example of a unicast communication link. In some cases, for unicast, broadcast, and multicast communications, a UE 115 may establish one or more sidelink communication links 205. For example, the UE 115-a may establish the sidelink communication link 205-a with the UE 115-b and may establish sidelink communication link 205-b with the UE 115-c. The UE 115-a may transmit and receive information via sidelink communication links 205. For example, the UE 115-a may transmit a message to the UE 115-b and the UE 115-c, concurrently. That is, the UE 115-a may multicast or broadcast the message to the UE 115-b and the UE 115-c via sidelink communication link 205-a and sidelink communication link 205-b, respectively. Additionally or alternatively, the UE 115-a may transmit (e.g., unicast) a message to the UE 115-b and may subsequently transmit (e.g., unicast) the message to the UE 115-c.

A UE 115 may monitor for sidelink communications, which may include activating one or more components that consume resources (e.g., power resources). In some cases, the UE 115 may have a large or unlimited power supply. For example, the UE 115 may be a vehicle in a V2X system. In such cases, the UE 115 (e.g., the vehicle) may remain in an active state, which may include continuously monitoring for communications. Additionally or alternatively, the UE 115 may monitor continuously for sidelink communications (e.g., when the UE 115 is not transmitting) and may receive sidelink communications to decode on some or all sidelink subchannels and slots. In some cases, UEs 115 associated with V2X systems (e.g., vehicles and wireless devices operated by pedestrians) may consume additional resources for monitoring sidelink communications due to an increased frequency of signaling between a large quantity of moving UEs 115. However, in some cases, one or more UEs 115 may be examples of wireless devices with limited power supplies (e.g., wireless devices operated by pedestrians). In such cases, UEs 115 may not continuously monitor for sidelink communications in order to save resources (e.g., power resources). Alternatively, the UEs 115 may monitor for sidelink communications during a time interval. For example, the UEs 115 may periodically monitor for sidelink communications and may periodically enter a power saving mode, which may reduce the consumption of resources.

The UEs 115 may operate according to one or more DRX cycles 210. In some cases, operating according to one or more DRX cycles 210 may be referred to as operating according to a DRX mode. A DRX cycle 210 may be an example of a schedule for monitoring resources periodically (e.g., sidelink resources). A DRX cycle 210 may include a DRX off-duration 220 and a DRX on-duration 225. The DRX off-duration 220 may include a quantity of slots or symbols. During the DRX off-duration 220, the UE 115 may not monitor for transmissions from other UEs 115 and may deactivate one or more components associated with monitoring for transmissions, which may result in reduced power consumption. The DRX on-duration 225 may include a quantity of slots or symbols. During the DRX on-duration 225, the UE 115 may monitor for transmissions from other UEs 115 and may activate one or more components associated with monitoring for transmissions, which may consume power. In some cases, the UE 115 may receive transmissions during a slot associated with a DRX cycle 210. For example, the UE 115-a may receive a PSCCH message 215 from the UE 115-b during a DRX on-duration 225.

In some cases, when a UE 115 is operating according to a DRX mode for receiving (e.g., a DRX cycle 210), the UE 115 may receive transmissions on some or all subchannels and slots within a DRX on-duration 225 and may attempt to decode PSCCH messages 215 from a quantity of candidate PSCCH resources. The UE 115 may receive one or more physical sidelink shared channel (PSSCH) messages 215 if one or more PSCCH messages 215 (e.g., one or more desired PSCCH messages 215) has been decoded. In some cases, a UE 115 may intend to transmit information to another UE 115 and may transmit during the DRX on-duration. For example, the UE 115-b may transmit the PSCCH message 215 to the UE 115-a during the DRX on-duration 225 and may not transmit the PSCCH message 215 to the UE 115-a during the DRX off-duration 220. In some cases, for unicast sidelink transmissions a DRX cycle 210 may be based on a direction of a transmission. The DRX cycle 210 may be configured for a transmitting UE 115. For example, the DRX cycle 210 may be based on one or more aspects associated with the transmitting UE 115. Additionally or alternatively, a configuration for the DRX cycle 210 may include assistance information from the receiving UE 115. In some cases, for groupcast and broadcast sidelink transmissions, the DRX configuration may be related to quality of service (QoS) requirements.

A DRX cycle 210 may be associated with a sidelink communication link 205. For example, the DRX cycle 210-*a* may be specific to the sidelink communication link 205-*a*. Similarly, the DRX cycle 210-*b* may be specific to the sidelink communication link 205-*b*. In some cases, a UE 115 may determine to operate according to one or more DRX cycles 210. For example, the UE 115-*a* may establish the sidelink communication link 205-*a* and the sidelink communication link 205-*b*. Accordingly, the UE 115-*a* may determine to operate according to the DRX cycle 210-*a* and the DRX cycle 210-*b*. In some cases, the DRX cycle 210-*a* and the DRX cycle 210-*b* may be synchronized (e.g., coordinated). For example, one or more DRX off-durations 220 of the DRX cycle 210-*a* may be overlap with one or more DRX off-durations 220 of the DRX cycle 210-*b*. Similarly, one or more DRX on-durations 225 of the DRX cycle 210-*a* may overlap with one or more DRX on-durations 225 of the DRX cycle 210-*b*. In some cases, if the DRX cycle 210-*a* and the DRX cycle 210-*b* are synchronized, a first slot of the DRX cycle 210-*a* may coincide with a first symbol of the DRX cycle 210-*b*. Additionally, each slot of the DRX off-duration 220 for the DRX cycle 210-*a* may overlap with each slot of the DRX off-duration 220 for the DRX cycle 210-*b*. Similarly, each slot of the DRX on-duration 225 for the DRX cycle 210-*a* may overlap with each slot of the DRX on-duration 225 for the DRX cycle 210-*b*. However, in some cases, the DRX cycle 210-*a* and the DRX cycle 210-*b* may not be synchronized. For example, the first slot of the DRX cycle 210-*a* may not coincide with the first slot of the DRX cycle 210-*b*. Additionally or alternatively, the DRX cycle 210-*a* may include a first quantity of slots in the DRX off-duration 220, and the DRX cycle 210-*b* may include a second quantity of slots in the DRX off-duration 220. In some cases, the first quantity of slots may be different from the second quantity of slots. Similarly, the DRX cycle 210-*a* and the DRX cycle 210-*b* may include DRX on-durations 225, which may not include a same quantity of slots.

If the UE 115-*a* establishes multiple sidelink communication links 205 and each sidelink communication link 205 is associated with a specific DRX cycle 210, the UE 115 may determine whether to enter a DRX on-duration 225 or a DRX off-duration 220. In some cases, the UE 115 may determine to prioritize one or more DRX on-durations 225, meaning that the UE 115 may default to monitoring transmission occasions associated with each sidelink communication link. The UE 115 may operate according to a DRX on-duration 225 during a DRX on-duration 225 of the DRX cycle 210-*a* and during a DRX on-duration 225 of the DRX cycle 210-*b*. In some cases, the UE 115 may operate according to a DRX on-duration 225 during any slot of a DRX on-duration 225 associated with a sidelink communication link 205 established by the UE 115. In some wireless networks where UEs 115 establish multiple sidelink communication links 205 (e.g., in V2X systems) UEs 115 may remain in active states (e.g., UEs 115 may operate according to the DRX on-duration 225) and may monitor for sidelink resources for an increased duration of time compared to wireless networks where UEs 115 establish fewer sidelink communication links 205 or establish a single sidelink communication link 205. In some cases, a receiving UE 115 may communicate via multiple unicast links, multiple groupcast sessions, or multiple applications sessions. One or more unique DRX cycles 210 may be associated with each unicast link, groupcast session or application session, which may keep the UE 115 awake (e.g., the UE 115 may not deactivate one or more components associated with power saving) for each respective DRX on-duration 225. As a result, the UE 115 may consume excess resources (e.g., power resources and communication resources).

In addition to the above described inefficiencies associated with monitoring sidelink resources using DRX cycles 210, additional inefficiencies may be present where UEs 115 operate according to DRX cycles 210. For example, the UE 115-*a* may monitor for sidelink transmissions from the UE 115-*b* during the DRX on-duration 225 associated with the DRX cycle 210-*a*. The UE 115-*a* may receive and decode the PSCCH message 215. However, in some cases, the PSCCH message may not include information for the UE 115-*a*. For example, the UE 115-*b* may transmit the PSCCH message 215 to the UE 115-*c*, which may be located within a receiving range of the UE 115-*b*, and the UE 115-*b* may receive the PSCCH message 215 as interference.

In some cases, the UE 115-*a* may be configured to decode each PSCCH message 215 included in a DRX on-duration 225. As a result, the UE 115-*a* may unnecessarily decode PSCCH messages 215 that may not be intended for the UE 115-*a*. In some other cases, the UE 115-*b* may operate according to the DRX on-duration 225 and may not receive any transmissions during the DRX on-duration 225. For example, the UE 115-*b* and the UE 115-*c* may not have any packets to transmit to the UE 115-*a*. As a result, the UE 115-*a* may consume resources associated with operating according to the DRX on-duration 225, despite not receiving any transmissions during the DRX on-duration 225. In some cases, a DRX cycle 210 may include one or more transport blocks (TBs) for periodic traffic. The UE 115 may receive transmissions included in the one or more TBs. However, the UE 115 may operate according to the DRX cycle 210, and the UE 115 may unnecessarily decode additional PSCCH messages 215 within the DRX on-duration 225. For example, the DRX on-duration 225 may include one transport block. However, the UE 115 may decode some or all possible PSCCHs in the DRX on-duration 225.

Figure 3:
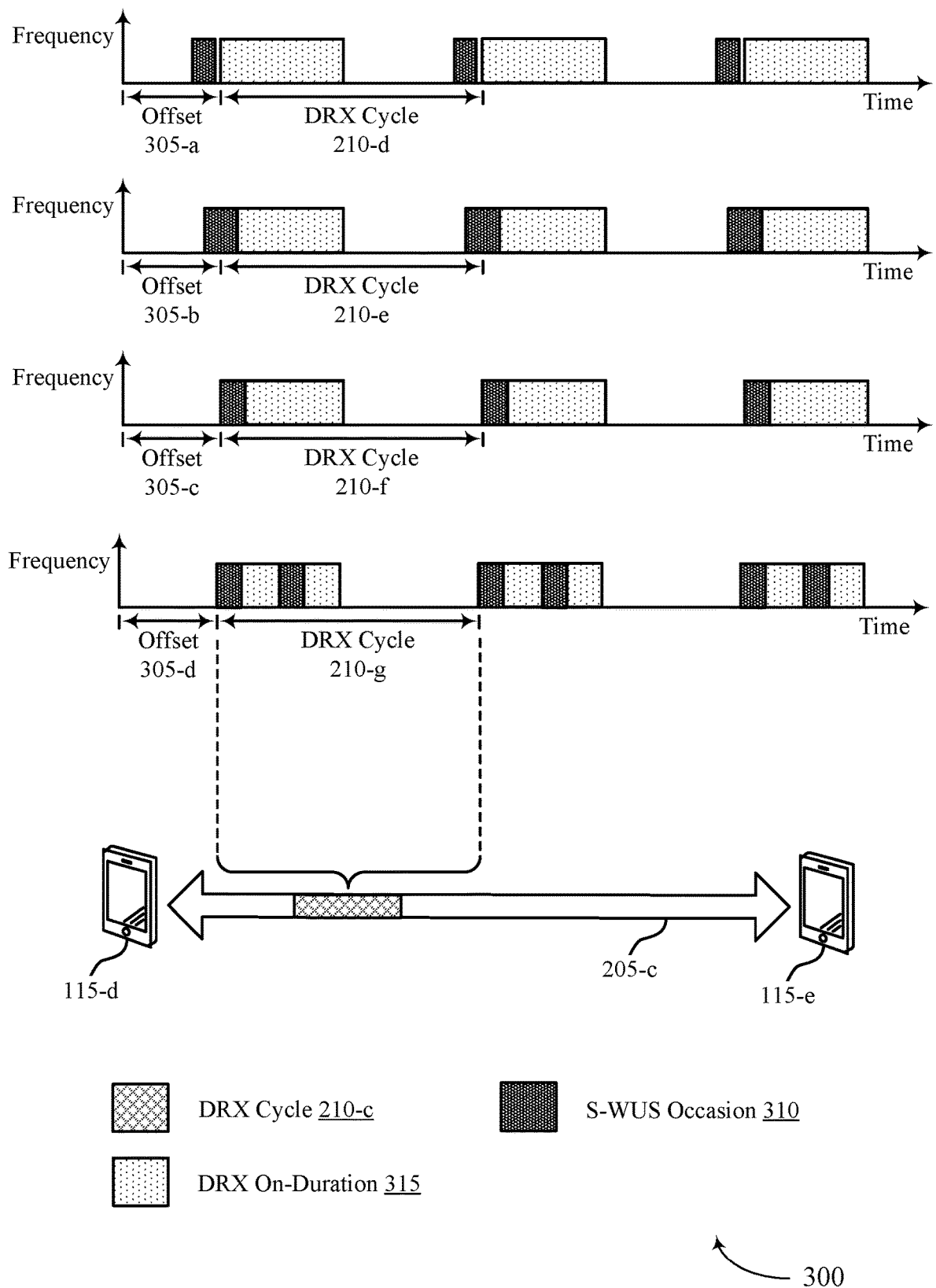
FIG. 3 illustrates examples of resource configurations that support destination-based sidelink wake-up signaling in accordance with aspects of the present disclosure.

FIG. 3 illustrates examples of resource configurations 300 that support destination-based sidelink wake-up signaling in accordance with aspects of the present disclosure. In some cases, the resource configurations 300 may implement aspects of the wireless communications system 100 and the wireless communications system 200. For example, the resource configurations 300 may include a UE 115-*d* and a UE 115-*e*, which may be examples of UEs 115 as described with reference to FIGS. 1 and 2. Additionally or alternatively, the resource configurations 300 may include a sidelink communication link 205-*c*, which may be an example of a sidelink communication link 205, as described with reference to FIG. 2. Additionally or alternatively, the resource configurations 300 may include a DRX cycle 210-*c*, a DRX cycle 210-*d*, a DRX cycle 210-*e*, a DRX cycle 210-*f*, and a DRX cycle 210-*g*, which may be an example of a DRXs 210 as described with reference to FIG. 2. The DRX cycles 210 may include one or more DRX on-durations 315, which may be examples of DRX on-duration 225 as described with reference to FIG. 2. In some cases, resource configurations 300 may include offsets 305, and S-WUS occasions 310.

A UE 115 may monitor one or more sidelink channels for transmissions from another UE 115. In some cases, a sidelink channel may include a range of time and frequency resources associated with a sidelink communication link 205. In some cases, the UE 115-*d* may monitor a sidelink channel for transmissions from the UE 115-*e*. Additionally or alternatively, the UE 115-*d* and/or the UE 115-*e*, may establish the sidelink communication link 205-*c*. The UE 115-*d* and the UE 115-*e* may operate according to the DRX cycle 210-c. For example, the UE 115-e may transmit information to the UE 115-d during a DRX on-duration 315 of the DRX cycle 210-c. In some cases, a UE 115 may transmit or receive information during one or more transmission occasions. In some cases, transmission occasions may occur during a DRX cycle 210.

The resource configurations 300 may include S-WUS occasions 310, which may be examples of transmission occasions. In some cases, one or more UEs 115 may transmit or receive one or more S-WUSs during one or more S-WUS occasions 310. The resource configurations 300 may illustrate multiple examples of configurations for S-WUS occasion 310. For example, an S-WUS occasion 310 may be configured to occur at a specific time with relation to a DRX cycle 210. In some cases, multiple S-WUS occasions 310 may occur with a DRX cycle 210. The DRX cycle 210-d, the DRX cycle 210-e, the DRX cycle 210-f, and the DRX cycle 210-g may be examples of the DRX cycle 210-c. In some case, the DRX cycle 210-d, the DRX cycle 210-e, the DRX cycle 210-f, and the DRX cycle 210-g may have a same duration, however, the location of S-WUS occasions 310 with respect to each DRX cycle 210 may be different. In some cases, each DRX cycle 210 may include a DRX on-duration 315. Each DRX on-duration 315 may have a same duration. In some cases, the DRX cycles 210 may occur periodically. In some cases, the DRX cycles 210 may repeat according to a periodicity. In some cases, a first DRX cycle 210 of a plurality of DRX cycles 210 (e.g., periodically repeated DRX cycles 210) may be preceded by an offset 305. For example, a UE 115 may not operate according to a DRX cycle 210 for a duration of an offset 305.

Various aspects of the present disclosure relate to a UE 115 receiving an S-WUS over a sidelink channel. The UE 115 may receive the S-WUS during an S-WUS occasion 310. For example, the UE 115-d may receive an S-WUS from the UE 115-e during an S-WUS occasion 310. Additionally, or alternatively, the UE 115-d may monitor for sidelink transmissions (e.g., S-WUS transmissions) during the S-WUS occasion 310. In some cases, resources for S-WUS transmission (e.g., the S-WUS occasion 310) may be pre-determined or pre-configured. For example, a base station or UE 115 may configure one or more time-frequency windows for S-WUS transmission. The time-frequency windows associated with the S-WUS occasions 310 may be indicated to one or more UEs 115 as part of a DRX configuration or an S-WUS configuration. In some other cases, a transmitting UE 115 may reserve time-frequency resources for S-WUS occasions 310 based on periodic resource reservations techniques. In some cases, an S-WUS occasion 310 may span a quantity of slots, which may be greater than or equal to one slot. Additionally or alternatively, an S-WUS occasion 310 may span a quantity of subchannels (e.g., frequency subchannels), which may be greater than or equal to 1 subchannel.

In some cases, an S-WUS may be transmitted as part of a sequence. For example, time-frequency resources associated with a sidelink channel may be preconfigured for sequential transmission of S-WUSs. In some cases, resources in a resource window (e.g., unused resources for physical sidelink feedback channel (PSFCH) transmission occasions) may be used for S-WUS transmissions. In some other cases, S-WUSs may be transmitted as messages (e.g., non-sequentially). For example, an S-WUS may be transmitted as a second stage sidelink control information (SCI-2) transmission. Additionally or alternatively, an S-WUS may be transmitted as a modified SCI-2 transmission (e.g., according to a new SCI-2 format or a legacy SCI-2 format).

In some cases, one or more codepoints of the SCI (e.g., the SCI-2) transmission may be modified to indicate that the SCI (e.g., the SCI-2) is for an S-WUS.

In some cases, the S-WUS may indicate if there are intended sidelink transmissions in a DRX cycle 210 or a DRX on-duration 315. For example, the UE 115-e may intend to transmit a sidelink message to the UE 115-d during an off-duration of the DRX cycle 210-d. Accordingly, the UE 115-e may transmit an S-WUS to the UE 115-d, which may indicate a destination ID associated with the UE 115-d. The UE 115-d may receive the S-WUS and determine to exit a DRX mode and monitor for sidelink transmissions (e.g., from the UE 115-e). That is, the UE 115-d may activate one or more components and monitor for transmissions instead of entering a DRX off-duration associated with the DRX cycle 210-d. Additionally or alternatively, if an intended sidelink transmission (e.g., from the UE 115-e) occurs during the DRX on-duration 315, the UE 115-d may determine to continue to operate according to the DRX on-duration 315 (e.g., the UE 115-d may determine to stay awake) and may receive the sidelink transmission from the UE 115-e. In some other cases, the UE 115-d may not receive an S-WUS, or the UE 115-d may receive one or more S-WUSs that do not include destination IDs corresponding to the UE 115-d. In response, the UE 115-d may determine to go to sleep for a duration of a DRX on-duration 315 (e.g., the UE 115-d may deactivate one or more components associated with monitoring for sidelink transmissions). In some other cases, the UE 115-d may not receive an S-WUS, or the UE 115-d may receive one or more S-WUSs that do not include destination IDs corresponding to the UE 115-d. In response, the UE 115-d may determine to continue to operate according to the DRX mode (e.g., the UE 115-d may fall back to regular DRX operation).

In some cases, the S-WUS occasion 310 may occur prior to a DRX cycle 210. For example, one or more S-WUS occasions 310 may occur prior to each DRX cycle 210-d. In some cases, one or more S-WUS occasions 310 may occur during an offset 305-a. For example, the first S-WUS occasion 310 of a plurality of S-WUS occasions 310 may overlap with the offset 305-a. Additionally or alternatively, one or more S-WUS occasions 310 may occur during one or more DRX off-durations. In some cases, one S-WUS occasion 310 may be associated with each DRX cycle 210. For example, each DRX cycle 210-d may be associated with an S-WUS occasion 310.

In some cases, one or more S-WUS occasions 310 may at least partially overlap with a DRX off-duration. For example, a first portion of the S-WUS occasion 310 may occur during a DRX off-duration associated with the DRX cycle 210-e and a second portion of the S-WUS occasion 310 may occur during the DRX on-duration 315 associated with the DRX cycle 210-e. Additionally or alternatively, a first portion of an S-WUS occasion 310 may occur during an offset 305-b and a second portion of the S-WUS occasion 310 may occur during the DRX on-duration 315 associated with the DRX cycle 210-e. In some cases, one or more S-WUS occasions 310 may at least partially overlap with a DRX on-duration 315. For example, an S-WUS occasion 310 may occur during the DRX on-duration 315 of the DRX cycle 210-f. In some cases, the DRX on-duration 315 may include the S-WUS occasion 310. For example, the DRX on-duration 315 and the S-WUS occasion 310 may begin at a same time. In some cases, the S-WUS occasion 310 may terminate before the DRX on-duration 315 terminates.

In some cases, a DRX cycle 210 (e.g., the DRX cycle 210-g) may include multiple S-WUS occasions 310. For example, the DRX cycle 210-g may include multiple S-WUS occasions 310 that at least partially overlap with the DRX on-duration 315. In some cases, a quantity of S-WUS occasions 310 within a DRX on-duration 315 may be implicitly determined based on a duration of the DRX on-duration 315. For example, a base station or a UE 115 may determine that a longer DRX on-duration 315 includes a larger quantity of S-WUS occasions 310. Alternatively, a base station or UE 115 may configure (e.g., preconfigure) the quantity of S-WUS occasions 310 within a DRX on-duration 315 based on an S-WUS configuration or a DRX configuration. The base station may indicate to the UE 115 a quantity of S-WUS occasions 310. In some cases, if the DRX on-duration 315 includes multiple S-WUS occasions, each associated S-WUS may keep the UE 115 awake until a subsequent S-WUS occasion 310. For example, the DRX on-duration 315 may include two S-WUS occasions 310. The UE 115-d may receive an S-WUS during the first S-WUS occasion 310. Accordingly, the UE 115-d may remain awake until the second S-WUS occasion 310. In some cases, the UE 115-d may be configured to wake up at each S-WUS occasion 310 to monitor the sidelink channel (e.g., for S-WUSs). In some cases, if the UE 115 does not receive an S-WUS during an S-WUS occasion 310, the UE 115 may determine to go to sleep until a subsequent S-WUS occasion 310. Accordingly, S-WUS occasions 310 may serve as checkpoints for S-WUSs.

In some cases, a UE 115 may transmit an S-WUS to another UE 115 to indicate an upcoming transmission (e.g., prior to a subsequent S-WUS occasion 310). For example, a DRX on-duration 315 may include a first S-WUS occasion 310 and a second S-WUS occasion 310. The UE 115-e may transmit an S-WUS to the UE 115-d during the first S-WUS occasion. The S-WUS may indicate that the UE 115-e intends to transmit information to the UE 115-d via the sidelink channel before the second S-WUS occasion 310. In some other cases, the UE 115-e may not intend to transmit information to the UE 115-d over the sidelink channel. However, the UE 115-e may still transmit an S-WUS, which may indicate that the UE 115-d may enter a sleep mode until the second S-WUS occasion 310. In some cases, the UE 115-e may reserve resources to transmit a sidelink transmission to the UE 115-d in a slot following the second S-WUS occasion 310. In such cases, the UE 115-e may not transmit an S-WUS in the second S-WUS occasion because the resource reservation may automatically extend the duration that the UE 115-d monitors for sidelink transmissions.

Although FIG. 3 depicts S-WUS occasions 310 including a same range of frequency resources as DRX on-durations 315, S-WUS occasions 310 may include a range of frequency resources different from the range of frequency resources associated with the DRX on-durations 315. For example, one or more S-WUS occasions 310 may include fewer frequency resources than DRX on-durations 315. In some cases, DRX on-durations 315 may be associated with one or more subchannels. However, S-WUS occasions 310 may be associated with one or more subchannels, which may be different from the one or more subchannels associated with DRX on-durations 315.

The UE 115 may receive an S-WUS, which may include a destination ID. The destination ID may be associated with the UE 115 (e.g., the UE 115 that receives the S-WUS), a UE group (e.g., a multicast group or a broadcast group), or a sidelink application. For example, the UE 115-d may receive an S-WUS from the UE 115-e. The S-WUS may include a destination ID associated with the UE 115-d. The destination ID may be a Destination Layer-2 ID (e.g., as determined in media access control (MAC)) or a Destination Layer-1 ID (e.g., the 16 bits least significant bit (LSB) of the Destination Layer-2 ID). Additionally or alternatively, the destination ID may be a string of binary values referred to as a destination address. In some cases, the destination ID may include a unicast destination ID, a multicast destination ID, or a broadcast destination ID. For example, the destination ID may indicate one or more destination nodes, such as one or more UEs 115.

In some cases, the UE 115-d may monitor resources of a sidelink channel associated with the S-WUS based on identifying the destination ID. For example, the UE 115-d, which may be operating according to a DRX cycle 210, may receive the S-WUS, identify the destination ID, and exit the DRX cycle 210 based on identifying the destination ID within S-WUS. The UE 115-d may monitor for resources based on identifying the destination ID. For example, the UE 115-d may enter an active mode and monitor for resources based on identifying the destination ID. Entering the active mode may include activating one or more components (e.g., the UE 115-d may exit a DRX mode associated with power saving and enter an active mode associated with monitoring for resources).

An S-WUS may be based on a destination ID, derived from a destination ID, and/or may carry a destination ID (e.g., explicitly or implicitly). The UE may infer a destination ID included in the S-WUS based on a gold sequence or a low PAPR sequence used to generate the S-WUS. In some cases, the gold sequence may also be referred to as a "gold code." The gold sequence may be an example of one or more binary sequences (e.g., random binary sequences). In some cases, the gold sequence may be an example of a pseudo-noise (PN) sequence, which may be a statistically uncorrelated sequence. In general, gold sequences may be used to reduce interference and/or noise between UEs 115, which may operate at a same frequency. The low PAPR sequence may additionally be an example of a sequence which may be used to reduce interference and/or noise between UEs 115. For example, a low PAPR sequence may improve cell coverage by enabling high power transmissions without saturating one or more power amplifiers associated with wireless communications.

A UE 115 may implicitly identify the destination ID. For example, the UE 115-e may transmit an S-WUS to the UE 115-d and the S-WUS may include a destination ID that is based on a gold sequence or a low PAPR sequence. In some cases, the UE 115-e may generate a seed of a gold sequence based on the destination ID of the intended recipient node. The receiving UE may then identify the destination ID based on the gold sequence associated with the received S-WUS. In some other cases, the seed of the gold sequence may be based on the destination ID. Additionally or alternatively, the S-WUS may be modulated using the gold sequence, which may be similar to reference signal modulation processes. Similarly, the UE 115-e may generate a low PAPR sequence based on the destination ID of the intended recipient node. The UE 115-d may receive the S-WUS and may implicitly determine the destination ID based on the low PAPR sequence associated with the S-WUS. As discussed above, the UE 115-d may identify that the destination ID is associated with the UE 115-d and may monitor one or more S-WUS occasions 310. Additionally or alternatively, an S-WUS may be selected from a set of determined low PAPR sequences such as one or more computer generated sequence (CGS) or one or more Zadoff-Chu sequences. The UE 115 may select the low PAPR sequence based on the destination ID. In some cases, a group number, u, of a low PAPR sequence may be determined based on the destination ID (e.g., u=mod(DST_ID, 30)).

The destination ID may be transmitted in a message, such as a sidelink control information (SCI) transmission. The destination ID may be explicitly or implicitly indicated by the S-WUS. For example, the S-WUS may include a parameter, which may indicate the destination ID. Additionally or alternatively, a demodulation reference signal (DMRS) sequence or scrambling sequence associated with the S-WUS may be generated based on the destination ID. In some cases, the destination ID may be a parameter used in a seed of a DMRS and/or scrambling sequence. Additionally or alternatively, the destination ID may be included in an IE associated with the S-WUS. In some cases, the UE 115-e may transmit an S-WUS to the UE 115-d, which may include an IE including a destination ID. That is, the destination ID may be explicitly indicated by the UE 115-e. The UE 115-d may receive the destination ID within the IE and monitor one or more S-WUS occasions 310 based on determining that the destination ID is associated with the UE 115-d.

Figure 4:
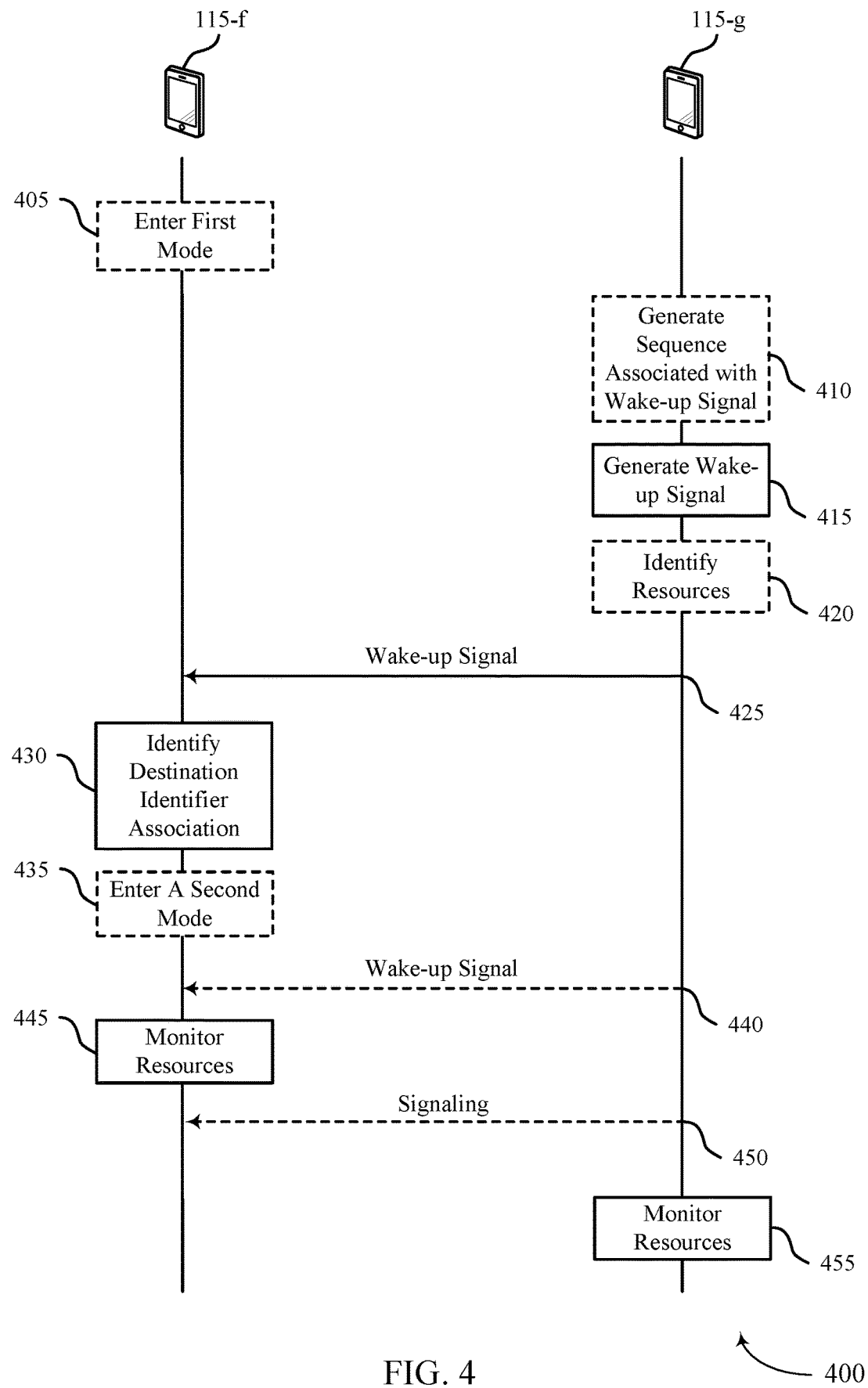
FIG. 4 illustrates an example of a process flow that supports destination-based sidelink wake-up signaling in accordance with aspects of the present disclosure.

FIG. 4 illustrates an example of a process flow 400 that supports destination-based sidelink wake-up signaling in accordance with aspects of the present disclosure. In some examples, the process flow 400 may implement aspects of the wireless communications system 100 and the wireless communications system 200. The process flow 400 may illustrate communications between a UE 115-f and a UE 115-g, which may be examples of UEs 115 as illustrated with reference to FIGS. 1, 2, and 3. Alternative examples of the following may be implemented, where some processes are performed in a different order than described or are not performed at all. In some implementations, processes may include additional features not mentioned below, or further processes may be added.

At 405, the UE 115-f may enter a first mode, where receiving a wake-up signal may be based on entering the first mode. In some cases, entering the first mode may include deactivating one or more components. The first mode may be a low-power mode associated with refraining from monitoring at least some resources on the sidelink channel. In some other cases, the first mode may be a DRX mode for the sidelink channel.

At 410, a UE 115-g may generate a sequence associated with the wake-up signal. The UE 115-g may generate a seed of a gold sequence based on a destination ID of the intended recipient (e.g., the UE 115-f). In some cases, the wake-up signal may be generated using the gold sequence. The UE 115-g may generate the wake-up signal based on a low PAPR sequence. The low PAPR sequence may be based on the destination ID of the intended recipient (e.g., the UE 115-f).

At 415, the UE 115-g may generate a wake-up signal including a destination ID for the UE 115-f. The destination ID may indicate a destination node of a sidelink channel configured to receive the wake-up signal. In some cases, generating the wake-up signal may include generating the wake-up signal including an information element indicating the destination ID.

At 420, the UE 115-g may identify resources for transmitting the wake-up signal. In some cases, transmitting the wake-up signal to the UE 115-f over the sidelink channel is based on identifying the resources. The resources may include one or more wake-up signal occasions. In some cases, the resources may be determined based on a duration of time associated with a DRX cycle. In some cases the resources may be preconfigured. Additionally or alternatively, the resources may be configured as part of a wake-up signal configuration or a DRX configuration.

At 425, the UE 115-g may transmit the wake-up signal to the UE 115-f over the sidelink channel. In some cases, transmitting the wake-up signal may include transmitting the wake-up signal during a transmission occasion for the wake-up signal that at least partially overlaps with an on-duration for a first mode. In some other cases, transmitting the wake-up signal may include transmitting the wake-up signal during a transmission occasion for the wake-up signal that at least partially overlaps with an off-duration for a first mode of operation of the UE 115-f In some cases, the UE 115-g may transmit the wake-up signal to the UE 115-f during an on-duration for a first mode for the wake-up signal. In some cases, the first mode may be a low-power mode for refraining from monitoring at least some resources on the sidelink channel. In some other cases, the first mode may be a DRX mode for the sidelink channel. In some cases, the UE 115-f may receive, from the UE 115-g, the wake-up signal over the sidelink channel between the UE 115-f and the UE 115-g, and the wake-up signal may include a destination ID that indicates a destination node of the sidelink channel configured to receive the wake-up signal. In some cases, receiving the wake-up signal may include receiving, as part of the wake-up signal, an information element indicating the destination ID of the wake-up signal.

At 430, the UE 115-f may identify that the destination ID indicated by the wake-up signal is for the UE 115-f based on receiving the wake-up signal. In some cases, identifying the destination ID may be based on a gold sequence associated with the wake-up signal. In some other cases, identifying the destination identifier is based on a low PAPR sequence associated with the wake-up signal.

At 435, the UE 115-f may enter a second mode based on identifying that the destination ID indicated by the wake-up signal is for the UE 115-f. In some cases, monitoring the resources is based on entering the second mode. Entering the second mode may include activating one or more components based on entering the second mode. In some cases, the UE 115-f may active one or more components during at least a portion of the on-duration. In some cases, monitoring the first transmission occasion may be based on activating the one or more components. In some cases, the UE 115-f may not detect the wake-up signal during the first transmission occasion. As a result, the UE 115-f may deactivate one or more components. In some cases, the UE 115-f may activate the one or more components during the on-duration based on deactivating the one or more components during the on-duration, where monitoring the second transmission occasion may be based on activating the one or more components. At 440, the UE 115-g may transmit a second wake-up signal during the on-duration for the first mode.

At 445, the UE 115-f may monitor resources of the sidelink channel based on identifying that the destination ID is for the UE 115-f. In some cases, monitoring the resources of the sidelink channel may include monitoring a first transmission occasion of an on-duration for the first mode for the wake-up signal. Additionally or alternatively, monitoring the resources of the sidelink channel may include monitoring a second transmission occasion of the on-duration for the wake-up signal. The first transmission occasion and the second transmission occasion may be included in a same on-duration. In some cases, monitoring the resources of the sidelink channel may include monitoring a transmission occasion for the wake-up signal, where the transmission occasion at least partially overlaps with an on-duration associated with a first mode. In some other cases, monitoring the resources of the sidelink channel may include monitoring a transmission occasion for the wake-up signal, where the transmission occasion at least partially overlaps with an off-duration associated with a first mode of operation of the UE 115-*f*.

At 450, the UE 115-*g* may transmit signaling to the UE 115-*f*. In some cases, the UE 115-*f* may receive the signaling based on monitoring resources. For example, the UE 115-*f* may monitor resources, which may enable the UE 115-*f* to receive the signaling from the UE 115-*g*. At 455, the UE 115-*g* may monitor resources of the sidelink channel based on transmitting the wake-up signal that includes the destination identifier for the UE 115-*f* over the sidelink channel.

Figure 5:
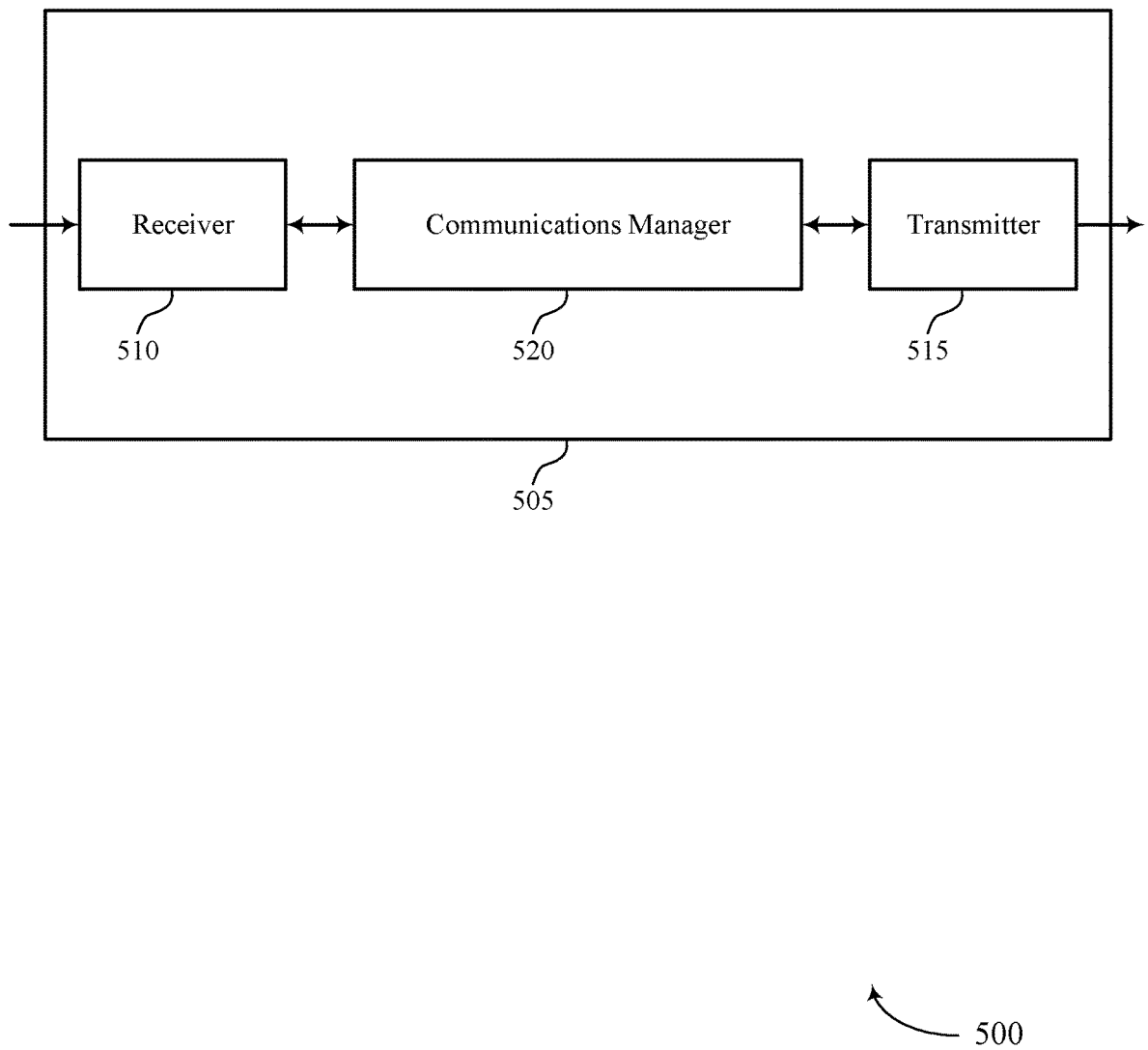
FIGS. 5 and 6 show block diagrams of devices that support destination-based sidelink wake-up signaling in accordance with aspects of the present disclosure.

FIG. 5 shows a block diagram 500 of a device 505 that supports destination-based sidelink wake-up signaling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to destination-based sidelink wake-up signaling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to destination-based sidelink wake-up signaling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of destination-based sidelink wake-up signaling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a second UE, a wake-up signal over a sidelink channel between the first UE and the second UE, the wake-up signal including a destination identifier that indicates a destination node of the sidelink channel configured to receive the wake-up signal. The communications manager 520 may be configured as or otherwise support a means for identifying that the destination identifier indicated by the wake-up signal is associated with the first UE based on receiving the wake-up signal. The communications manager 520 may be configured as or otherwise support a means for monitoring resources of the sidelink channel based on identifying that the destination identifier is associated with the first UE.

Additionally or alternatively, the communications manager 520 may support wireless communication at a second UE in accordance with examples as disclosed herein. For example, the communications manager 520 may be configured as or otherwise support a means for generating a wake-up signal including a destination identifier associated with a first UE, the destination identifier indicating a destination node of a sidelink channel configured to receive the wake-up signal. The communications manager 520 may be configured as or otherwise support a means for transmitting the wake-up signal to the first UE over the sidelink channel. The communications manager 520 may be configured as or otherwise support a means for monitoring resources of the sidelink channel based on transmitting the wake-up signal that comprises the destination identifier associated with the first UE over the sidelink channel.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption, improved communication reliability, more efficient utilization of communication resources, and improved coordination between devices. For example, the device 505 may support reduced power consumption associated with sidelink communications based on transmitting or receiving one or more S-WUSs. The techniques for reduced power consumption may allow the device 505 to reducing the processing overhead at the device 505 and more efficiently monitor for sidelink transmissions. Additionally or alternatively, the S-WUS described herein may support concurrent communications for the device 505 (e.g., via one or more unicast, multicast, or broadcast communication links), improving data throughput and reducing an amount of time that the processing units of the device 505 remain powered on for handling wireless communications, further reducing the processing overhead at the device 505.

Figure 6:
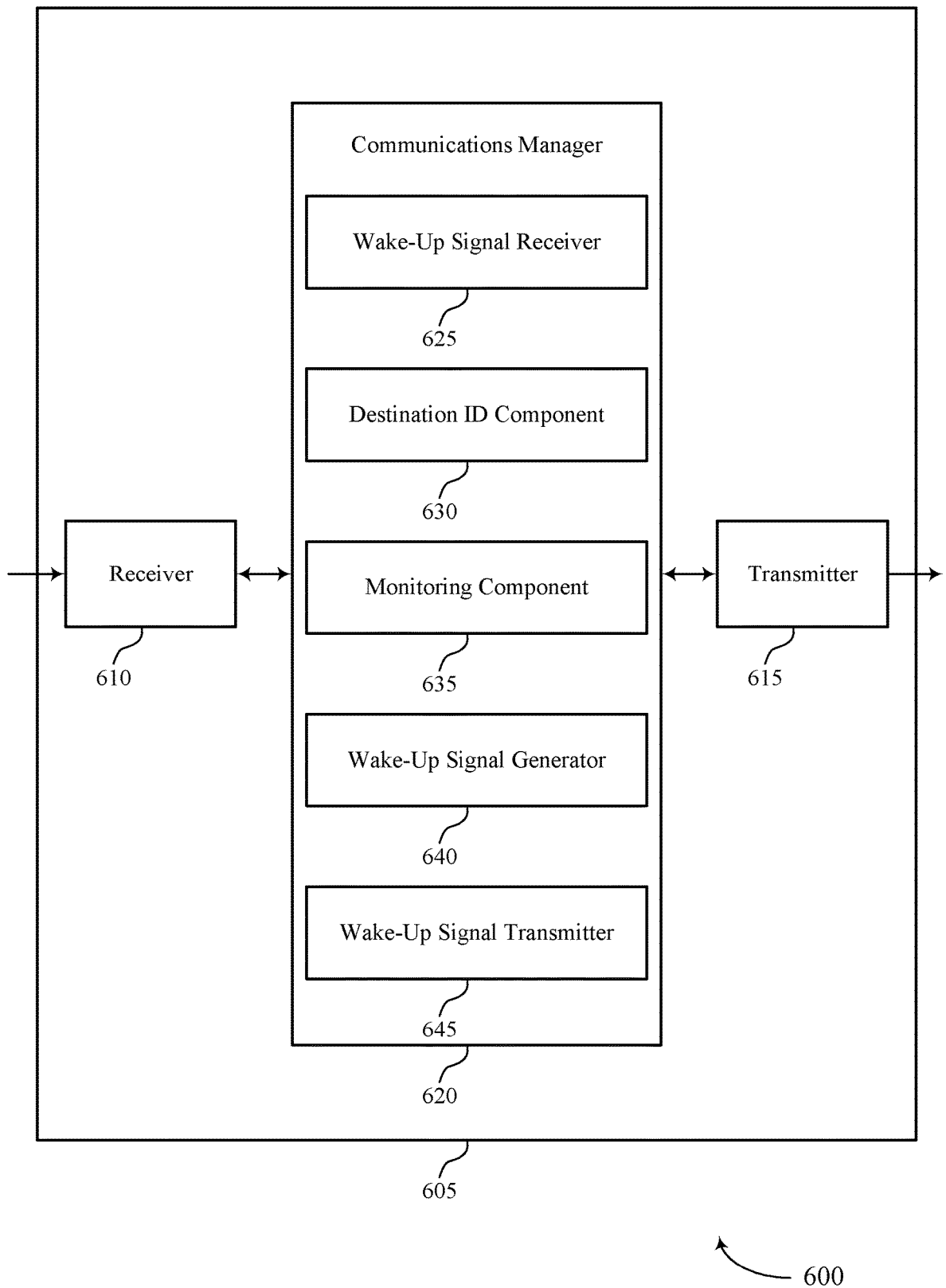

FIG. 6 shows a block diagram 600 of a device 605 that supports destination-based sidelink wake-up signaling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to destination-based sidelink wake-up signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to destination-based sidelink wake-up signaling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of destination-based sidelink wake-up signaling as described herein. For example, the communications manager 620 may include a wake-up signal receiver 625, a destination ID component 630, a monitoring component 635, a wake-up signal generator 640, a wake-up signal transmitter 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The wake-up signal receiver 625 may be configured as or otherwise support a means for receiving, from a second UE, a wake-up signal over a sidelink channel between the first UE and the second UE, the wake-up signal including a destination identifier that indicates a destination node of the sidelink channel configured to receive the wake-up signal. The destination ID component 630 may be configured as or otherwise support a means for identifying that the destination identifier indicated by the wake-up signal is associated with the first UE based on receiving the wake-up signal. The monitoring component 635 may be configured as or otherwise support a means for monitoring resources of the sidelink channel based on identifying that the destination identifier is associated with the first UE.

Additionally or alternatively, the communications manager 620 may support wireless communication at a second UE in accordance with examples as disclosed herein. The wake-up signal generator 640 may be configured as or otherwise support a means for generating a wake-up signal including a destination identifier associated with a first UE, the destination identifier indicating a destination node of a sidelink channel configured to receive the wake-up signal. The wake-up signal transmitter 645 may be configured as or otherwise support a means for transmitting the wake-up signal to the first UE over the sidelink channel. The monitoring component 635 may be configured as or otherwise support a means for monitoring resources of the sidelink channel based on transmitting the wake-up signal that comprises the destination identifier associated with the first UE over the sidelink channel.

Figure 7:
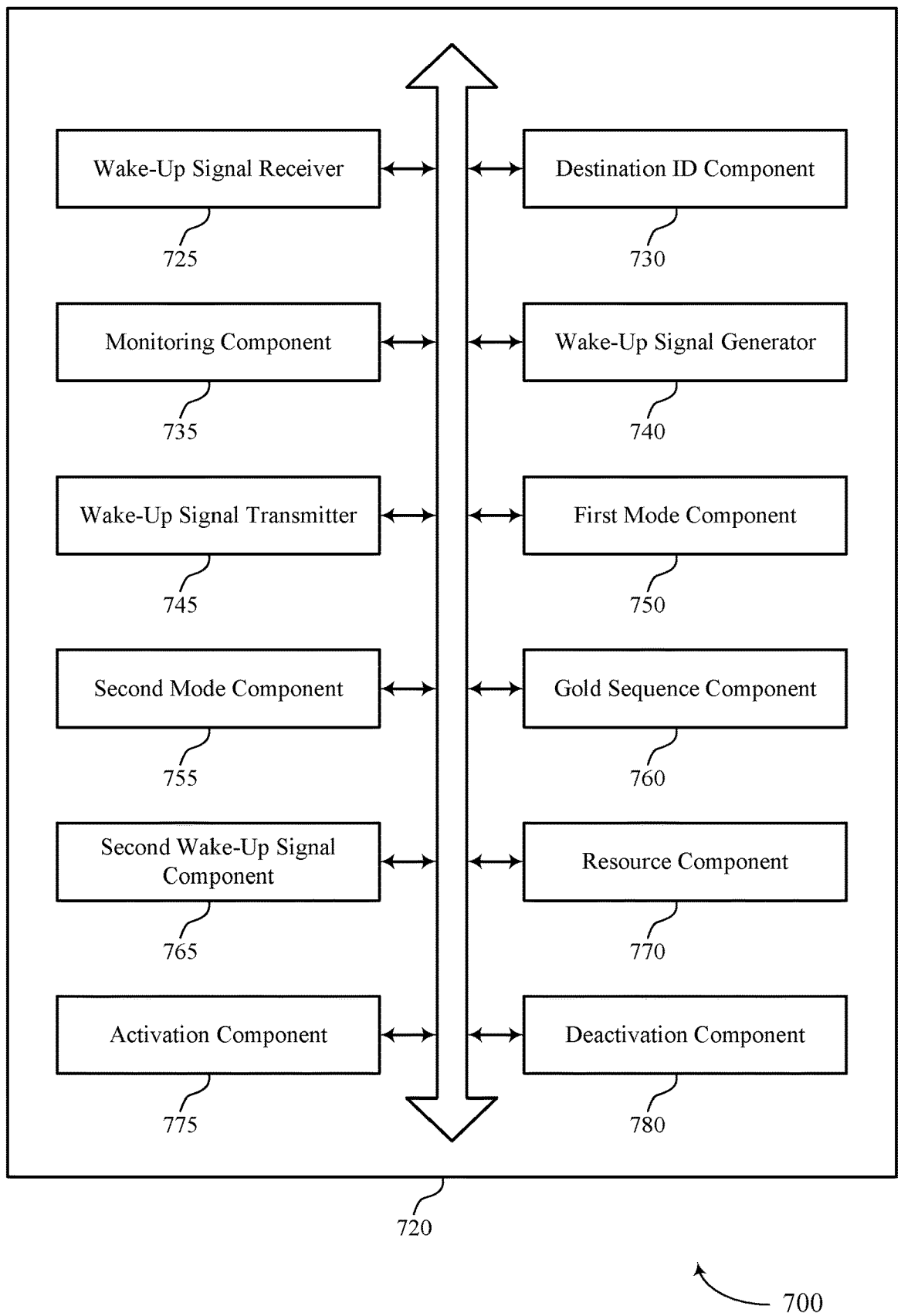
FIG. 7 shows a block diagram of a communications manager that supports destination-based sidelink wake-up signaling in accordance with aspects of the present disclosure.

FIG. 7 shows a block diagram 700 of a communications manager 720 that supports destination-based sidelink wake-up signaling in accordance with aspects of the present disclosure. The communications manager 720 may be an example of aspects of a communications manager 520, a communications manager 620, or both, as described herein. The communications manager 720, or various components thereof, may be an example of means for performing various aspects of destination-based sidelink wake-up signaling as described herein. For example, the communications manager 720 may include a wake-up signal receiver 725, a destination ID component 730, a monitoring component 735, a wake-up signal generator 740, a wake-up signal transmitter 745, a first mode component 750, a second mode component 755, a gold sequence component 760, a second wake-up signal component 765, a resource component 770, an activation component 775, a deactivation component 780, or any combination thereof. Each of these components may communicate, directly or indirectly, with one another (e.g., via one or more buses).

The communications manager 720 may support wireless communication at a first UE in accordance with examples as disclosed herein. The wake-up signal receiver 725 may be configured as or otherwise support a means for receiving, from a second UE, a wake-up signal over a sidelink channel between the first UE and the second UE, the wake-up signal including a destination identifier that indicates a destination node of the sidelink channel configured to receive the wake-up signal. The destination ID component 730 may be configured as or otherwise support a means for identifying that the destination identifier indicated by the wake-up signal is associated with the first UE based on receiving the wake-up signal. The monitoring component 735 may be configured as or otherwise support a means for monitoring resources of the sidelink channel based on identifying that the destination identifier is associated with the first UE.

In some examples, to support receiving the wake-up signal, the wake-up signal receiver 725 may be configured as or otherwise support a means for receiving, as part of the wake-up signal, an information element indicating the destination identifier of the wake-up signal.

In some examples, to support monitoring the resources of the sidelink channel, the monitoring component 735 may be configured as or otherwise support a means for monitoring a first transmission occasion of an on-duration associated with a first mode for the wake-up signal. In some examples, to support monitoring the resources of the sidelink channel, the monitoring component 735 may be configured as or otherwise support a means for monitoring a second transmission occasion of the on-duration for the wake-up signal, where the first transmission occasion and the second transmission occasion are included in a same on-duration.

In some examples, the activation component 775 may be configured as or otherwise support a means for activating one or more components during at least a portion of the on-duration, where monitoring the first transmission occasion is based on activating the one or more components. In some examples, the deactivation component 780 may be configured as or otherwise support a means for deactivating the one or more components during the on-duration based on failing to detect the wake-up signal during the first transmission occasion. In some examples, the activation component 775 may be configured as or otherwise support a means for activating the one or more components during the on-duration based on deactivating the one or more components during the on-duration, where monitoring the second transmission occasion is based on activating the one or more components.

In some examples, identifying the destination identifier is based on a gold sequence associated with the wake-up signal.

In some examples, identifying the destination identifier is based on a low PAPR sequence associated with the wake-up signal.

In some examples, to support monitoring the resources of the sidelink channel, the monitoring component 735 may be configured as or otherwise support a means for monitoring a transmission occasion for the wake-up signal, where the transmission occasion at least partially overlaps with an on-duration associated with a first mode.

In some examples, to support monitoring the resources of the sidelink channel, the monitoring component 735 may be configured as or otherwise support a means for monitoring a transmission occasion for the wake-up signal, where the transmission occasion at least partially overlaps with an off-duration associated with a first mode of operation of the first UE.

In some examples, the first mode component 750 may be configured as or otherwise support a means for entering, by the first UE, a first mode, where receiving the wake-up signal is based on entering the first mode.

In some examples, to support entering the first mode, the first mode component 750 may be configured as or otherwise support a means for deactivating one or more components.

In some examples, the first mode is a low-power mode associated with refraining from monitoring at least some resources on the sidelink channel.

In some examples, the first mode is a DRX mode associated with the sidelink channel.

In some examples, the second mode component 755 may be configured as or otherwise support a means for entering, by the first UE, a second mode based on identifying that the destination identifier indicated by the wake-up signal is associated with the first UE, where monitoring the resources is based on entering the second mode.

In some examples, to support entering the second mode, the second mode component 755 may be configured as or otherwise support a means for activating one or more components based on entering the second mode.

Additionally or alternatively, the communications manager 720 may support wireless communication at a second UE in accordance with examples as disclosed herein. The wake-up signal generator 740 may be configured as or otherwise support a means for generating a wake-up signal including a destination identifier associated with a first UE, the destination identifier indicating a destination node of a sidelink channel configured to receive the wake-up signal. The wake-up signal transmitter 745 may be configured as or otherwise support a means for transmitting the wake-up signal to the first UE over the sidelink channel. In some examples, the monitoring component 735 may be configured as or otherwise support a means for monitoring resources of the sidelink channel based on transmitting the wake-up signal that comprises the destination identifier associated with the first UE over the sidelink channel.

In some examples, the gold sequence component 760 may be configured as or otherwise support a means for generating a seed of a gold sequence based on the destination identifier of the first UE, where the wake-up signal is generated using the gold sequence.

In some examples, to support generating the wake-up signal, the wake-up signal generator 740 may be configured as or otherwise support a means for generating the wake-up signal based on a low PAPR sequence, where the PAPR sequence is based on the destination identifier.

In some examples, to support generating the wake-up signal, the wake-up signal generator 740 may be configured as or otherwise support a means for generating the wake-up signal including an information element indicating the destination identifier.

In some examples, to support transmitting the wake-up signal, the wake-up signal transmitter 745 may be configured as or otherwise support a means for transmitting the wake-up signal during a transmission occasion for the wake-up signal that at least partially overlaps with an on-duration associated with a first mode.

In some examples, the first mode is a low-power mode associated with refraining from monitoring at least some resources on the sidelink channel.

In some examples, the first mode is a DRX mode associated with the sidelink channel.

In some examples, to support transmitting the wake-up signal, the wake-up signal transmitter 745 may be configured as or otherwise support a means for transmitting the wake-up signal during a transmission occasion for the wake-up signal that at least partially overlaps with an off-duration associated with a first mode of operation of the first UE.

In some examples, the wake-up signal is transmitted during an on-duration associated with a first mode for the wake-up signal, and the second wake-up signal component 765 may be configured as or otherwise support a means for transmitting a second wake-up signal during the on-duration associated with the first mode.

In some examples, the resource component 770 may be configured as or otherwise support a means for identifying resources for transmitting the wake-up signal, where transmitting the wake-up signal to the first UE over the sidelink channel is based on identifying the resources.

Figure 8:
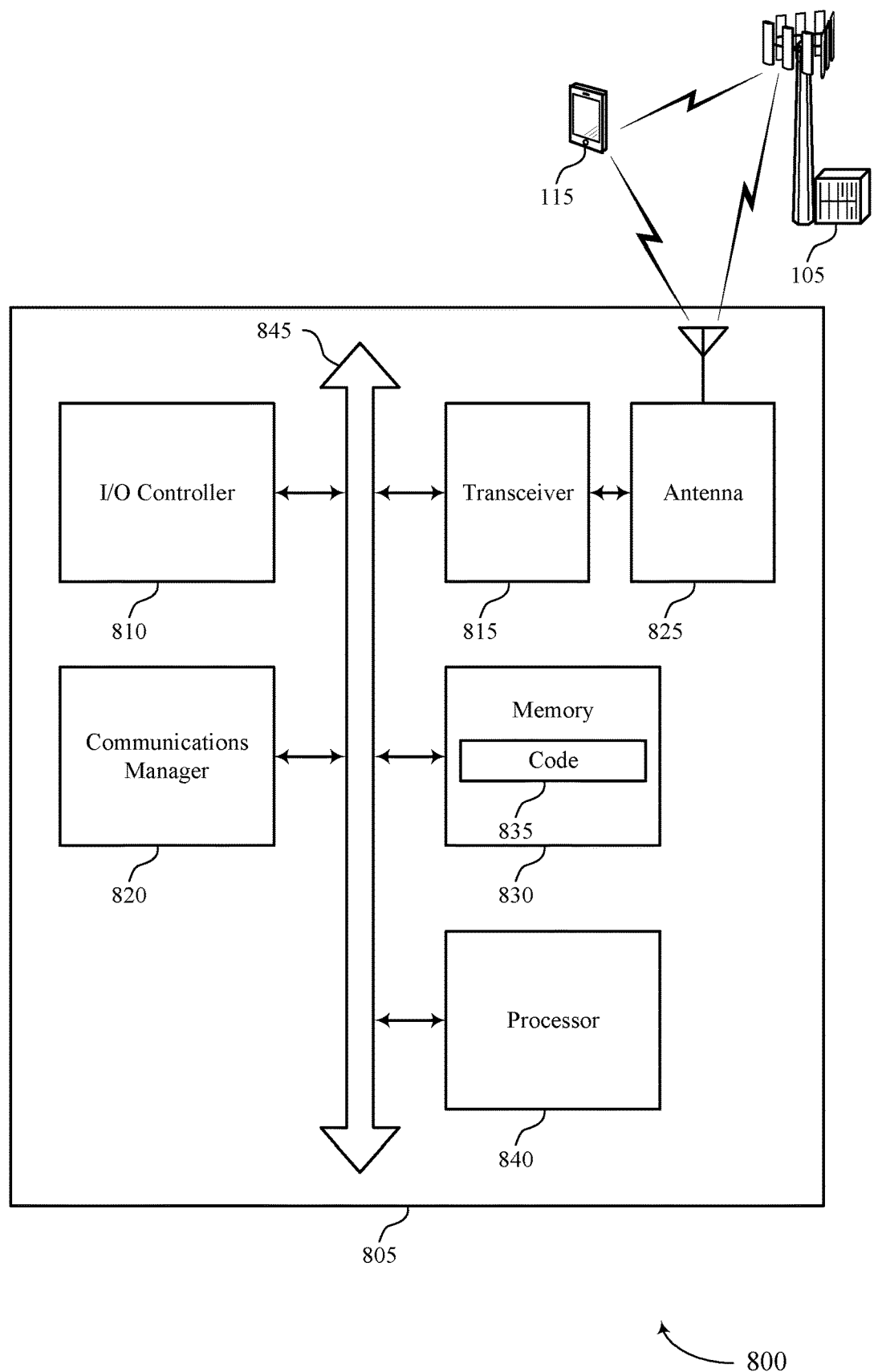
FIG. 8 shows a diagram of a system including a device that supports destination-based sidelink wake-up signaling in accordance with aspects of the present disclosure.

FIG. 8 shows a diagram of a system 800 including a device 805 that supports destination-based sidelink wake-up signaling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting destination-based sidelink wake-up signaling). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a second UE, a wake-up signal over a sidelink channel between the first UE and the second UE, the wake-up signal including a destination identifier that indicates a destination node of the sidelink channel configured to receive the wake-up signal. The communications manager 820 may be configured as or otherwise support a means for identifying that the destination identifier indicated by the wake-up signal is associated with the first UE based on receiving the wake-up signal. The communications manager 820 may be configured as or otherwise support a means for monitoring resources of the sidelink channel based on identifying that the destination identifier is associated with the first UE.

Additionally or alternatively, the communications manager 820 may support wireless communication at a second UE in accordance with examples as disclosed herein. For example, the communications manager 820 may be configured as or otherwise support a means for generating a wake-up signal including a destination identifier associated with a first UE, the destination identifier indicating a destination node of a sidelink channel configured to receive the wake-up signal. The communications manager 820 may be configured as or otherwise support a means for transmitting the wake-up signal to the first UE over the sidelink channel. The communications manager 820 may be configured as or otherwise support a means for monitoring resources of the sidelink channel based on transmitting the wake-up signal that comprises the destination identifier associated with the first UE over the sidelink channel.

By including or configuring the communications manager 820 in accordance with examples as described herein, the device 805 may support techniques for reduced power consumption, improved communication reliability, more efficient utilization of communication resources, and improved coordination between devices. For example, the device 805 may support reduced power consumption associated with sidelink communications based on transmitting or receiving one or more S-WUSs. The techniques for reduced power consumption may allow the device 805 to reducing the processing overhead at the device 805 and more efficiently monitor for sidelink transmissions. Additionally or alternatively, the S-WUS described herein may support concurrent communications for the device 805 (e.g., via one or more unicast, multicast, or broadcast communication links), improving data throughput and reducing an amount of time that the processing units of the device 805 remain powered on for handling wireless communications, further reducing the processing overhead at the device 805

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of destination-based sidelink wake-up signaling as described herein, or the processor 840 and the memory 830 may be otherwise configured to perform or support such operations.

Figure 9:
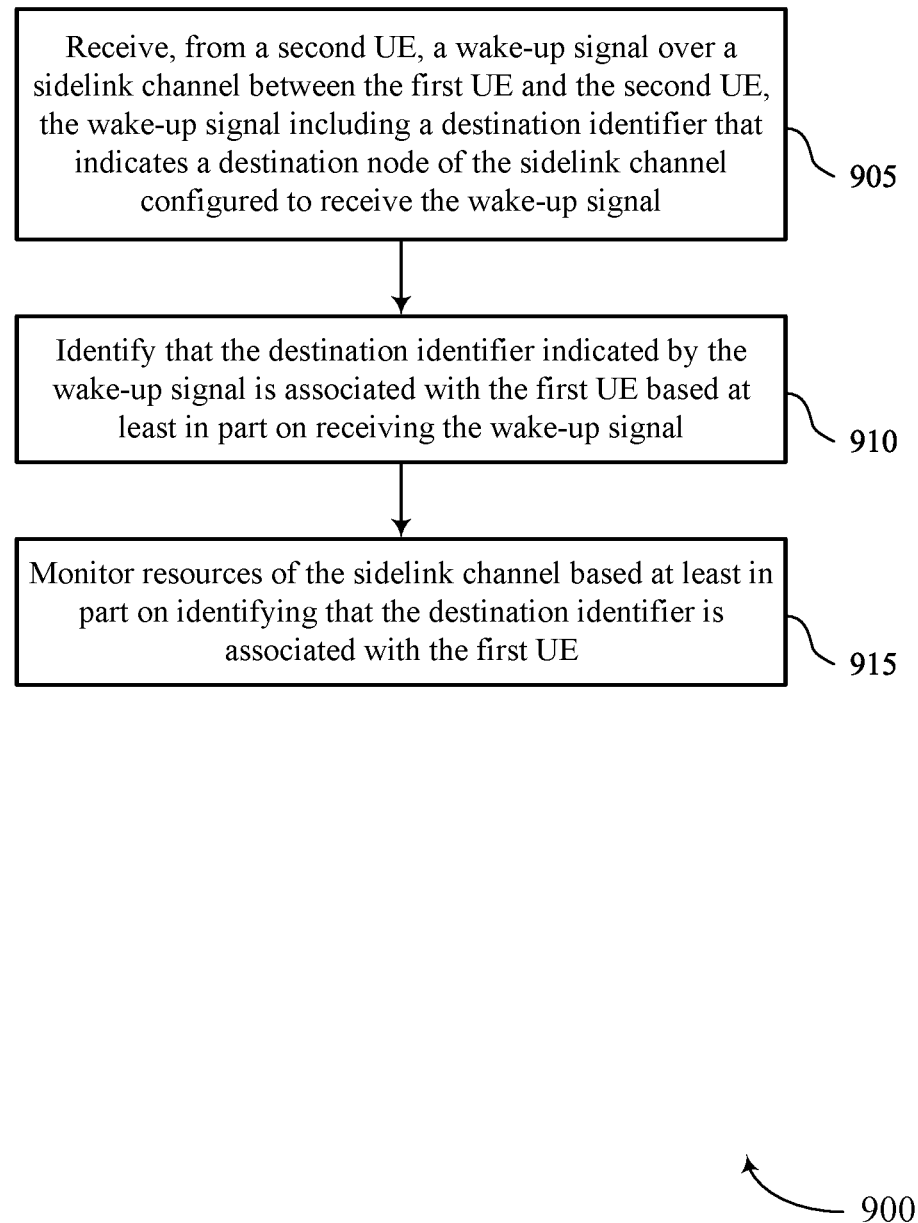
FIGS. 9 through 12 show flowcharts illustrating methods that support destination-based sidelink wake-up signaling in accordance with aspects of the present disclosure.

FIG. 9 shows a flowchart illustrating a method 900 that supports destination-based sidelink wake-up signaling in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a second UE, a wake-up signal over a sidelink channel between the first UE and the second UE, the wake-up signal including a destination identifier that indicates a destination node of the sidelink channel configured to receive the wake-up signal. The operations of 905 may be performed in accordance with examples as disclosed herein. In some examples, aspects of the operations of 905 may be performed by a wake-up signal receiver 725 as described with reference to FIG. 7.

At 910, the method may include identifying that the destination identifier indicated by the wake-up signal is associated with the first UE based on receiving the wake-up signal. The operations of 910 may be performed in accordance with examples as disclosed herein. In some examples, aspects of the operations of 910 may be performed by a destination ID component 730 as described with reference to FIG. 7.

At 915, the method may include monitoring resources of the sidelink channel based on identifying that the destination identifier is associated with the first UE. The operations of 915 may be performed in accordance with examples as disclosed herein. In some examples, aspects of the operations of 915 may be performed by a monitoring component 735 as described with reference to FIG. 7.

Figure 10:
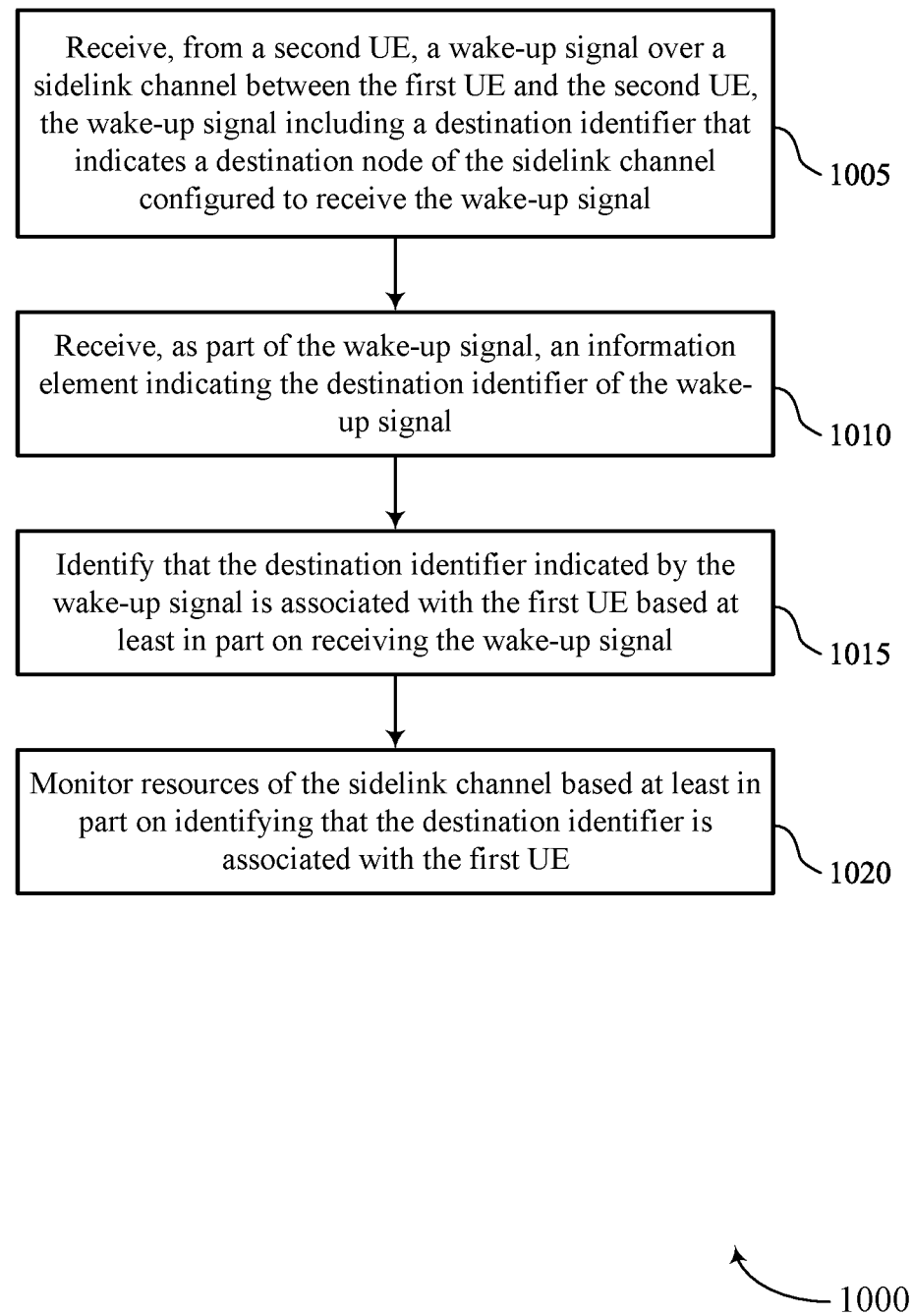

FIG. 10 shows a flowchart illustrating a method 1000 that supports destination-based sidelink wake-up signaling in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a second UE, a wake-up signal over a sidelink channel between the first UE and the second UE, the wake-up signal including a destination identifier that indicates a destination node of the sidelink channel configured to receive the wake-up signal. The operations of 1005 may be performed in accordance with examples as disclosed herein. In some examples, aspects of the operations of 1005 may be performed by a wake-up signal receiver 725 as described with reference to FIG. 7.

At 1010, the method may include receiving, as part of the wake-up signal, an information element indicating the destination identifier of the wake-up signal. The operations of 1010 may be performed in accordance with examples as disclosed herein. In some examples, aspects of the operations of 1010 may be performed by a wake-up signal receiver 725 as described with reference to FIG. 7.

At 1015, the method may include identifying that the destination identifier indicated by the wake-up signal is associated with the first UE based on receiving the wake-up signal. The operations of 1015 may be performed in accordance with examples as disclosed herein. In some examples, aspects of the operations of 1015 may be performed by a destination ID component 730 as described with reference to FIG. 7.

At 1020, the method may include monitoring resources of the sidelink channel based on identifying that the destination identifier is associated with the first UE. The operations of 1020 may be performed in accordance with examples as disclosed herein. In some examples, aspects of the operations of 1020 may be performed by a monitoring component 735 as described with reference to FIG. 7.

Figure 11:
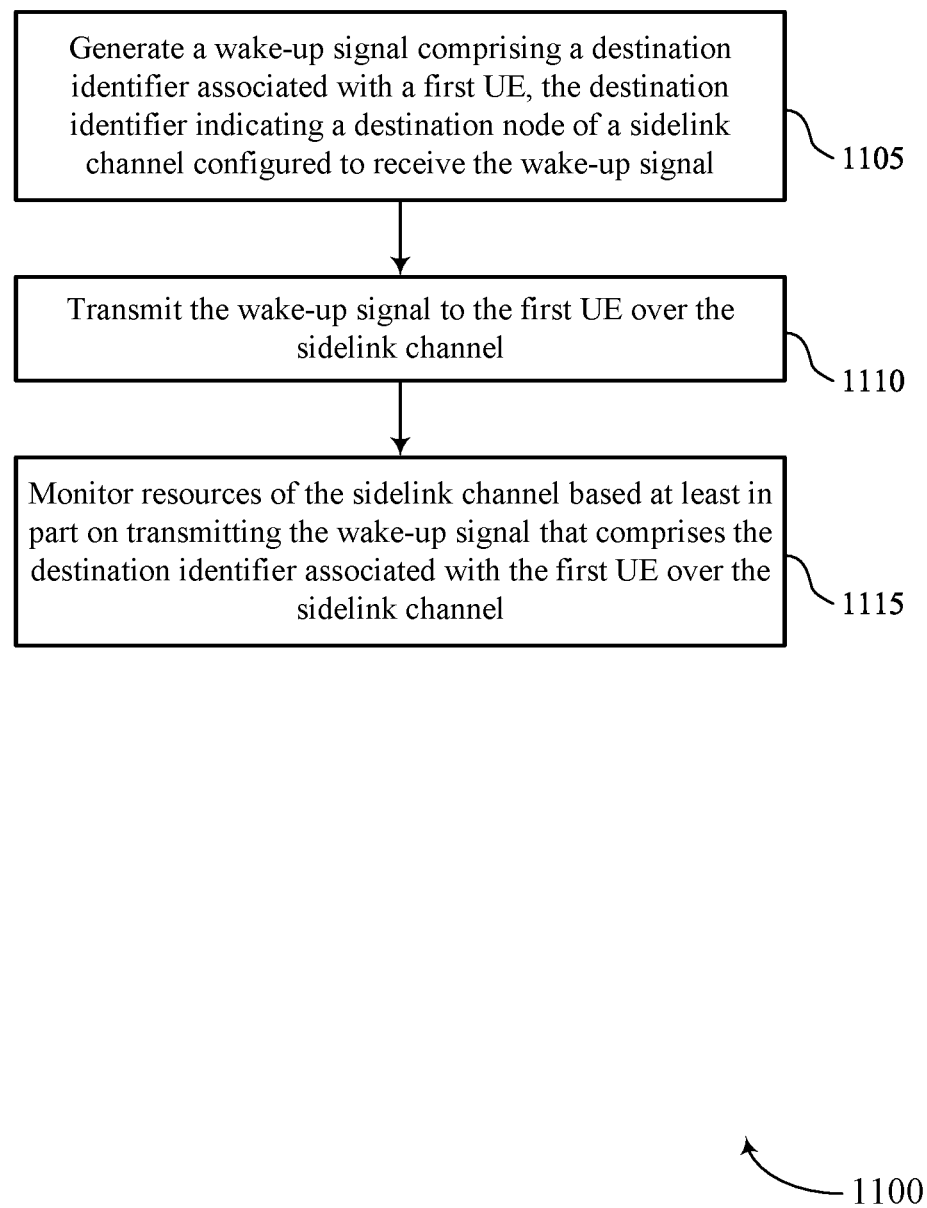

FIG. 11 shows a flowchart illustrating a method 1100 that supports destination-based sidelink wake-up signaling in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include generating a wake-up signal including a destination identifier associated with a first UE, the destination identifier indicating a destination node of a sidelink channel configured to receive the wake-up signal. The operations of 1105 may be performed in accordance with examples as disclosed herein. In some examples, aspects of the operations of 1105 may be performed by a wake-up signal generator 740 as described with reference to FIG. 7.

At 1110, the method may include transmitting the wake-up signal to the first UE over the sidelink channel. The operations of 1110 may be performed in accordance with examples as disclosed herein. In some examples, aspects of the operations of 1110 may be performed by a wake-up signal transmitter 745 as described with reference to FIG. 7.

At 1115, the method may include monitoring resources of the sidelink channel based on transmitting the wake-up signal that comprises the destination identifier associated with the first UE over the sidelink channel. The operations of 1115 may be performed in accordance with examples as disclosed herein. In some examples, aspects of the operations of 1115 may be performed by a monitoring component 735 as described with reference to FIG. 7.

Figure 12:
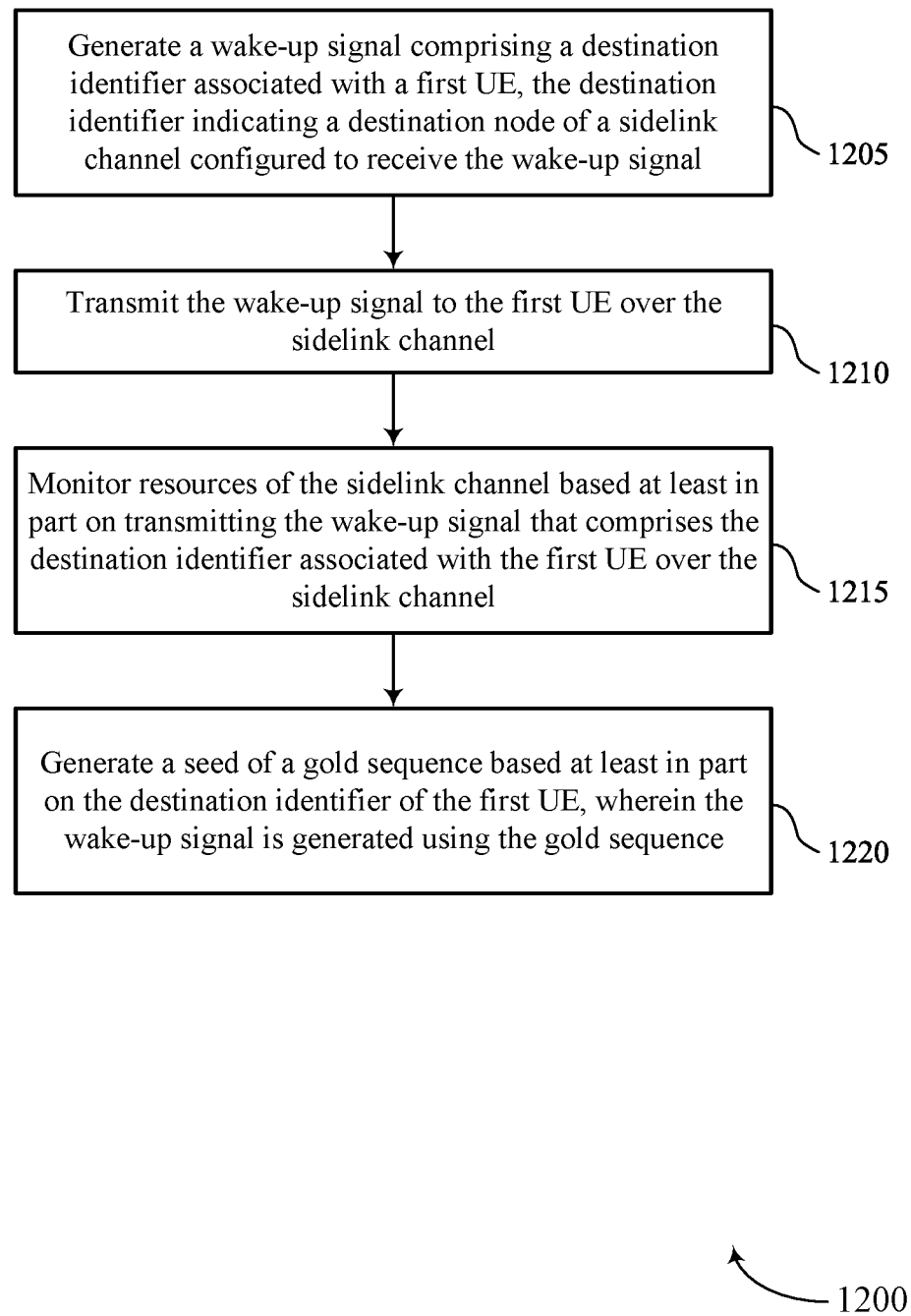

FIG. 12 shows a flowchart illustrating a method 1200 that supports destination-based sidelink wake-up signaling in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include generating a wake-up signal including a destination identifier associated with a first UE, the destination identifier indicating a destination node of a sidelink channel configured to receive the wake-up signal. The operations of 1205 may be performed in accordance with examples as disclosed herein. In some examples, aspects of the operations of 1205 may be performed by a wake-up signal generator 740 as described with reference to FIG. 7.

At 1210, the method may include transmitting the wake-up signal to the first UE over the sidelink channel. The operations of 1210 may be performed in accordance with examples as disclosed herein. In some examples, aspects of the operations of 1210 may be performed by a wake-up signal transmitter 745 as described with reference to FIG. 7.

At 1215, the method may include monitoring resources of the sidelink channel based on transmitting the wake-up signal that comprises the destination identifier associated with the first UE over the sidelink channel. The operations of 1215 may be performed in accordance with examples as disclosed herein. In some examples, aspects of the operations of 1215 may be performed by a monitoring component 735 as described with reference to FIG. 7.

At 1220, the method may include generating a seed of a gold sequence based on the destination identifier of the first UE, where the wake-up signal is generated using the gold sequence. The operations of 1220 may be performed in accordance with examples as disclosed herein. In some examples, aspects of the operations of 1220 may be performed by a gold sequence component 760 as described with reference to FIG. 7.

The following provides an overview of aspects of the present disclosure:

Aspect 1: A method for wireless communication at a first UE, comprising: receiving, from a second UE, a wake-up signal over a sidelink channel between the first UE and the second UE, the wake-up signal comprising a destination identifier that indicates a destination node of the sidelink channel configured to receive the wake-up signal; identifying that the destination identifier indicated by the wake-up signal is associated with the first UE based at least in part on receiving the wake-up signal; and monitoring resources of the sidelink channel based at least in part on identifying that the destination identifier is associated with the first UE.

Aspect 2: The method of aspect 1, wherein receiving the wake-up signal further comprises: receiving, as part of the wake-up signal, an information element indicating the destination identifier of the wake-up signal.

Aspect 3: The method of any of aspects 1 through 2, wherein monitoring the resources of the sidelink channel further comprises: monitoring a first transmission occasion of an on-duration associated with a first mode for the wake-up signal; and monitoring a second transmission occasion of the on-duration for the wake-up signal, wherein the first transmission occasion and the second transmission occasion are included in a same on-duration.

Aspect 4: The method of aspect 3, further comprising: activating one or more components during at least a portion of the on-duration, wherein monitoring the first transmission occasion is based at least in part on activating the one or more components; deactivating the one or more components during the on-duration based at least in part on failing to detect the wake-up signal during the first transmission occasion; and activating the one or more components during the on-duration based at least in part on deactivating the one or more components during the on-duration, wherein monitoring the second transmission occasion is based at least in part on activating the one or more components.

Aspect 5: The method of any of aspects 1 through 4, wherein identifying the destination identifier is based at least in part on a gold sequence associated with the wake-up signal.

Aspect 6: The method of any of aspects 1 through 4, wherein identifying the destination identifier is based at least in part on a low peak-to-average-power ratio (PAPR) sequence associated with the wake-up signal.

Aspect 7: The method of any of aspects 1 through 6, wherein monitoring the resources of the sidelink channel further comprises: monitoring a transmission occasion for the wake-up signal, wherein the transmission occasion at least partially overlaps with an on-duration associated with a first mode.

Aspect 8: The method of any of aspects 1 through 6, wherein monitoring the resources of the sidelink channel further comprises: monitoring a transmission occasion for the wake-up signal, wherein the transmission occasion at least partially overlaps with an off-duration associated with a first mode of operation of the first UE.

Aspect 9: The method of any of aspects 1 through 8, further comprising: entering, by the first UE, a first mode, wherein receiving the wake-up signal is based at least in part on entering the first mode.

Aspect 10: The method of aspect 9, wherein entering the first mode further comprises: deactivating one or more components.

Aspect 11: The method of any of aspects 9 through 10, wherein the first mode is a low-power mode associated with refraining from monitoring at least some resources on the sidelink channel.

Aspect 12: The method of any of aspects 9 through 10, wherein the first mode is a DRX mode associated with the sidelink channel.

Aspect 13: The method of any of aspects 1 through 12, further comprising: entering, by the first UE, a second mode based at least in part on identifying that the destination identifier indicated by the wake-up signal is associated with the first UE, wherein monitoring the resources is based at least in part on entering the second mode.

Aspect 14: The method of aspect 13, wherein entering the second mode further comprises: activating one or more components based at least in part on entering the second mode.

Aspect 15: A method for wireless communication at a second UE, comprising: generating a wake-up signal comprising a destination identifier associated with a first UE, the destination identifier indicating a destination node of a sidelink channel configured to receive the wake-up signal; transmitting the wake-up signal to the first UE over the sidelink channel; and monitoring resources of the sidelink channel based at least in part on transmitting the wake-up signal that comprises the destination identifier associated with the first UE over the sidelink channel.

Aspect 16: The method of aspect 15, further comprising: generating a seed of a gold sequence based at least in part on the destination identifier of the first UE, wherein the wake-up signal is generated using the gold sequence.

Aspect 17: The method of aspect 15, wherein generating the wake-up signal further comprises: generating the wake-up signal based at least in part on a low peak-to-averagepower ratio (PAPR) sequence, wherein the low PAPR sequence is based at least in part on the destination identifier.

Aspect 18: The method of aspect 15, wherein generating the wake-up signal further comprises: generating the wake-up signal comprising an information element indicating the destination identifier.

Aspect 19: The method of any of aspects 15 through 18, wherein transmitting the wake-up signal further comprises: transmitting the wake-up signal during a transmission occasion for the wake-up signal that at least partially overlaps with an on-duration associated with a first mode.

Aspect 20: The method of aspect 19, wherein the first mode is a low-power mode associated with refraining from monitoring at least some resources on the sidelink channel.

Aspect 21: The method of aspect 19, wherein the first mode is a DRX mode associated with the sidelink channel.

Aspect 22: The method of any of aspects 15 through 18, wherein transmitting the wake-up signal further comprises: transmitting the wake-up signal during a transmission occasion for the wake-up signal that at least partially overlaps with an off-duration associated with a first mode of operation of the first UE.

Aspect 23: The method of any of aspects 15 through 22, wherein the wake-up signal is transmitted during an on-duration associated with a first mode for the wake-up signal, the method further comprising: transmitting a second wake-up signal during the on-duration associated with the first mode.

Aspect 24: The method of any of aspects 15 through 23, further comprising: identifying resources for transmitting the wake-up signal, wherein transmitting the wake-up signal to the first UE over the sidelink channel is based at least in part on identifying the resources.

Aspect 25: An apparatus for wireless communication at a first UE, comprising a processor; memory coupled with the processor; and instructions stored in the memory and executable by the processor to cause the apparatus to perform a method of any of aspects 1 through 14.

Aspect 26: An apparatus for wireless communication at a first UE, comprising at least one means for performing a method of any of aspects 1 through 14.

Aspect 27: A non-transitory computer-readable medium storing code for wireless communication at a first UE, the code comprising instructions executable by a processor to perform a method of any of aspects 1 through 14.

Aspect 28: An apparatus for wireless communication at a second UE, comprising a processor; memory coupled with the processor; and instructions stored in the memory and executable by the processor to cause the apparatus to perform a method of any of aspects 15 through 24.

Aspect 29: An apparatus for wireless communication at a second UE, comprising at least one means for performing a method of any of aspects 15 through 24.

Aspect 30: A non-transitory computer-readable medium storing code for wireless communication at a second UE, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a second UE, a wake-up signal over a sidelink channel between the first UE and the second UE, the wake-up signal comprising a destination identifier that indicates a destination node of the sidelink channel configured to receive the wake-up signal, wherein the wake-up signal indicates whether the second UE intends to transmit information to the first UE during an on-duration of a discontinuous reception (DRX) mode;
   identifying that the destination identifier indicated by the wake-up signal is associated with the first UE based at least in part on receiving the wake-up signal; and
   monitoring one or more resources of the sidelink channel during the on-duration of the DRX mode based at least in part on identifying that the destination identifier is associated with the first UE.

2. The method of claim 1, wherein receiving the wake-up signal further comprises:
   receiving, as part of the wake-up signal, an information element indicating the destination identifier of the wake-up signal.

3. The method of claim 1, further comprising:
   monitoring a first transmission occasion of the on-duration for the wake-up signal; and
   monitoring a second transmission occasion of the on-duration for the wake-up signal.

4. The method of claim 3, further comprising:
   activating one or more components during at least a portion of the on-duration, wherein monitoring the first transmission occasion is based at least in part on activating the one or more components;
   deactivating the one or more components during the on-duration based at least in part on failing to detect the wake-up signal during the first transmission occasion; and
   activating the one or more components during the on-duration based at least in part on deactivating the one or more components during the on-duration, wherein monitoring the second transmission occasion is based at least in part on activating the one or more components.

5. The method of claim 1, wherein identifying the destination identifier is based at least in part on a gold sequence associated with the wake-up signal.

6. The method of claim 1, wherein identifying the destination identifier is based at least in part on a low peak-to-average-power ratio (PAPR) sequence associated with the wake-up signal.

7. The method of claim 1, further comprising:
   monitoring a transmission occasion for the wake-up signal, wherein the transmission occasion at least partially overlaps with the on-duration.

8. The method of claim 1, further comprising:
   monitoring a transmission occasion for the wake-up signal, wherein the transmission occasion at least partially overlaps with an off-duration associated with the DRX mode.

9. The method of claim 1, further comprising:
   entering, by the first UE, the DRX mode, wherein receiving the wake-up signal is based at least in part on entering the DRX mode.

10. The method of claim 9, wherein entering the DRX mode further comprises:
    deactivating one or more components.

11. The method of claim 1, further comprising:
    exiting, by the first UE, the DRX mode based at least in part on identifying that the destination identifier indicated by the wake-up signal is associated with the first UE, wherein monitoring the one or more resources is based at least in part on exiting the DRX mode.

12. The method of claim 11, wherein exiting the DRX mode further comprises:
activating one or more components based at least in part on exiting the DRX mode.

13. A method for wireless communication at a second user equipment (UE), comprising:
generating a wake-up signal comprising a destination identifier associated with a first UE, the destination identifier indicating a destination node of a sidelink channel configured to receive the wake-up signal, wherein the wake-up signal indicates whether the second UE intends to transmit information to the first UE during an on-duration of a discontinuous reception (DRX) mode;
transmitting the wake-up signal to the first UE over the sidelink channel; and
monitoring one or more resources of the sidelink channel during the on-duration of the DRX mode based at least in part on transmitting the wake-up signal that comprises the destination identifier associated with the first UE over the sidelink channel.

14. The method of claim 13, further comprising:
generating a seed of a gold sequence based at least in part on the destination identifier of the first UE, wherein the wake-up signal is generated using the gold sequence.

15. The method of claim 13, wherein generating the wake-up signal further comprises:
generating the wake-up signal based at least in part on a low peak-to-average-power ratio (PAPR) sequence, wherein the low PAPR sequence is based at least in part on the destination identifier.

16. The method of claim 13, wherein generating the wake-up signal further comprises:
generating the wake-up signal comprising an information element indicating the destination identifier.

17. The method of claim 13, wherein transmitting the wake-up signal further comprises:
transmitting the wake-up signal during a transmission occasion for the wake-up signal that at least partially overlaps with the on-duration.

18. The method of claim 13, wherein transmitting the wake-up signal further comprises:
transmitting the wake-up signal during a transmission occasion for the wake-up signal that at least partially overlaps with an off-duration associated with the DRX mode.

19. The method of claim 13, wherein the wake-up signal is transmitted during the on-duration, the method further comprising:
transmitting a second wake-up signal during the on-duration.

20. The method of claim 13, further comprising:
identifying resources for transmitting the wake-up signal, wherein transmitting the wake-up signal to the first UE over the sidelink channel is based at least in part on identifying the resources.

21. An apparatus for wireless communication at a first user equipment (UE), comprising:
a processor;
memory coupled with the processor; and
instructions stored in the memory and executable by the processor to cause the apparatus to:
receive, from a second UE, a wake-up signal over a sidelink channel between the first UE and the second UE, the wake-up signal including a destination identifier that indicates a destination node of the sidelink channel configured to receive the wake-up signal, wherein the wake-up signal indicates whether the second UE intends to transmit information to the first UE during an on-duration of a discontinuous reception (DRX) mode;
identify that the destination identifier indicated by the wake-up signal is associated with the first UE based at least in part on receiving the wake-up signal; and
monitor one or more resources of the sidelink channel during the on-duration of the DRX mode based at least in part on identifying that the destination identifier is associated with the first UE.

22. The apparatus of claim 21, wherein the instructions are further executable by the processor to cause the apparatus to:
monitor a first transmission occasion of the on-duration for the wake-up signal; and
monitor a second transmission occasion of the on-duration for the wake-up signal.

23. The apparatus of claim 21, wherein the instructions to receive the wake-up signal are further executable by the processor to cause the apparatus to:
receive, as part of the wake-up signal, an information element indicating the destination identifier of the wake-up signal.

24. The apparatus of claim 21, wherein the instructions are further executable by the processor to cause the apparatus to:
monitor a first transmission occasion of the on-duration for the wake-up signal; and
monitor a second transmission occasion of the on-duration for the wake-up signal.

25. An apparatus for wireless communication at a second user equipment (UE), comprising:
a processor;
memory coupled with the processor; and
instructions stored in the memory and executable by the processor to cause the apparatus to:
generate a wake-up signal comprising a destination identifier associated with a first UE, the destination identifier indicating a destination node of a sidelink channel configured to receive the wake-up signal, wherein the wake-up signal indicates whether the second UE intends to transmit information to the first UE during an on-duration of a discontinuous reception (DRX) mode;
transmit the wake-up signal to the first UE over the sidelink channel; and
monitor one or more resources of the sidelink channel during the on-duration of the DRX mode based at least in part on the destination identifier associated with the first UE.

26. The apparatus of claim 25, wherein the instructions are further executable by the processor to cause the apparatus to:
generate a seed of a gold sequence based at least in part on the destination identifier of the first UE, wherein the wake-up signal is generated using the gold sequence.

* * * * *